US008706926B2

(12) United States Patent
Yoon et al.

(10) Patent No.: US 8,706,926 B2
(45) Date of Patent: Apr. 22, 2014

(54) ARCHITECTURE FOR DATA STORAGE SYSTEMS

(75) Inventors: Tony Yoon, Cupertino, CA (US); Siu-Hung Fred Au, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 687 days.

(21) Appl. No.: 12/579,678

(22) Filed: Oct. 15, 2009

(65) Prior Publication Data

US 2010/0091399 A1    Apr. 15, 2010

Related U.S. Application Data

(60) Provisional application No. 61/105,592, filed on Oct. 15, 2008.

(51) Int. Cl.
*G06F 3/00* (2006.01)
(52) U.S. Cl.
USPC ............... 710/52; 710/53; 711/100; 711/151; 711/153; 711/167; 360/55
(58) Field of Classification Search
None
See application file for complete search history.

(56) References Cited

U.S. PATENT DOCUMENTS

| | | | | |
|---|---|---|---|---|
| 4,956,768 | A * | 9/1990 | Sidi et al. | 710/53 |
| 5,594,926 | A * | 1/1997 | Chang et al. | 710/52 |
| 5,737,632 | A | 4/1998 | Oeda et al. | 710/1 |
| 6,178,057 | B1 * | 1/2001 | Kuroda et al. | 360/51 |
| 6,418,101 | B1 * | 7/2002 | Finkelstein | 369/47.18 |
| 6,430,660 | B1 * | 8/2002 | Kemp et al. | 711/153 |
| 6,530,000 | B1 * | 3/2003 | Krantz et al. | 711/151 |
| 6,597,812 | B1 * | 7/2003 | Fallon et al. | 382/232 |
| 6,662,334 | B1 * | 12/2003 | Stenfort | 714/769 |
| 6,859,789 | B1 * | 2/2005 | Hayashi et al. | 705/50 |
| 7,050,705 | B1 * | 5/2006 | Mori | 386/235 |
| 7,243,185 | B2 * | 7/2007 | See et al. | 711/103 |
| 8,214,719 | B1 * | 7/2012 | Sheng et al. | 714/763 |
| 2002/0024753 | A1 * | 2/2002 | Uno | 360/45 |

(Continued)

FOREIGN PATENT DOCUMENTS

| | | |
|---|---|---|
| JP | H03-189719 | 8/1991 |
| JP | H07-169185 | 7/1995 |

(Continued)

OTHER PUBLICATIONS

'Integrated Drive Electronics / AT Attachment (IDE/ATA) Interface' by PCGuide.com, copyright 1997-2004.*

(Continued)

*Primary Examiner* — Steven Snyder

(57) ABSTRACT

A hard disk controller (HDC) of a hard disk drive (HDD) includes an encoder module, a buffer manager module, N first-in first-out (FIFO) modules, and N read channel modules, where N is an integer greater than 1. The encoder module is configured to encode data received from a host and to generate P units of encoded data, where P is an integer greater than 1. The buffer manager module is configured to store the P units of encoded data in a buffer, retrieve N of the P units from the buffer, and output the N units in parallel. The N FIFO modules are configured to receive the N units in parallel from the buffer manager. The N read channel modules are configured to receive the N units from the N FIFO modules in parallel, respectively, and to output the N units to a magnetic medium of the HDD.

21 Claims, 16 Drawing Sheets

(56) References Cited

U.S. PATENT DOCUMENTS

| | | | |
|---|---|---|---|
| 2003/0002188 A1* | 1/2003 | Bliss et al. | 360/48 |
| 2003/0058564 A1 | 3/2003 | Saito | 360/53 |
| 2004/0054847 A1 | 3/2004 | Spencer et al. | 711/104 |
| 2006/0152981 A1 | 7/2006 | Ryu | |
| 2006/0171053 A1* | 8/2006 | Sai et al. | 360/55 |
| 2008/0104352 A1 | 5/2008 | Talbot | 711/167 |
| 2008/0195798 A1* | 8/2008 | Lee et al. | 711/103 |
| 2008/0195810 A1* | 8/2008 | Wu et al. | 711/114 |
| 2010/0211707 A1* | 8/2010 | Li et al. | 710/52 |
| 2011/0029723 A1* | 2/2011 | Lee et al. | 711/103 |

FOREIGN PATENT DOCUMENTS

| | | |
|---|---|---|
| JP | H07-507170 | 8/1995 |
| JP | 2001-195844 | 7/2001 |
| JP | 2002-8239 | 1/2002 |
| JP | 2006195990 A | 7/2006 |
| JP | 2011508712 A | 3/2011 |
| WO | WO93-21575 | 10/1993 |
| WO | WO-9702529 A1 | 1/1997 |
| WO | WO-2011159806 A2 | 12/2011 |

OTHER PUBLICATIONS

Notification of Transmittal of the International Search Report and the Written Opinion of the International Searching Authority, or the Declaration dated Apr. 1, 2010 in reference to PCT/US2009/060823 (11 pgs).

Summary of Notice of Reasons for Rejection for related Japanese Application No. 2011-532246; Ryuka Law Firm; Mar. 19, 2013; 2 pages.

Japanese Application No. 2011-532246 Summary of Notice of Reasons for Rection, Ari Ryuka, Aug. 21, 2012, 2 pages.

* cited by examiner

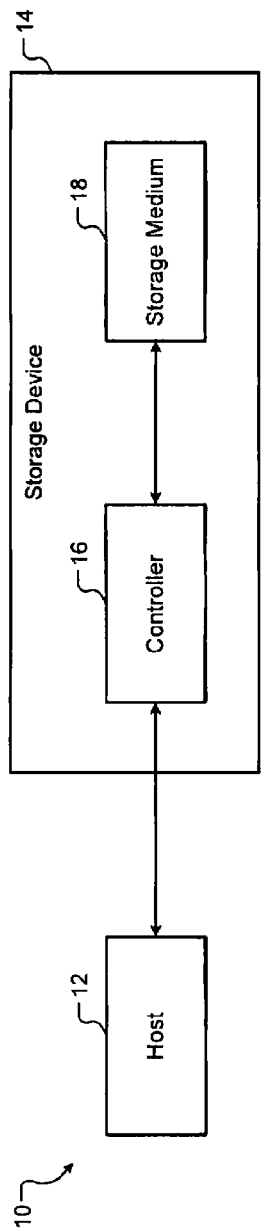
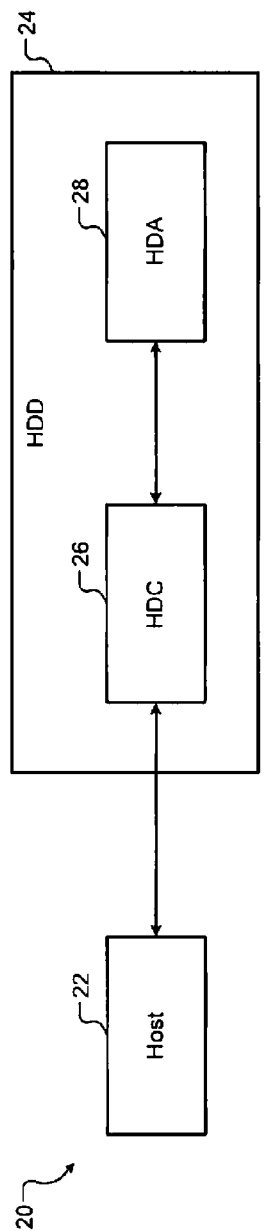
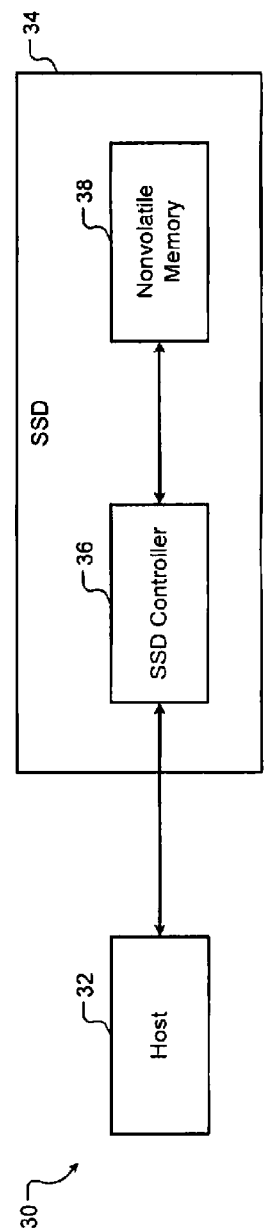
FIG. 1A
Prior Art
FIG. 1B
Prior Art
FIG. 1C
Prior Art

ARCHITECTURE FOR DATA STORAGE SYSTEMS

CROSS-REFERENCE TO RELATED APPLICATIONS

This application claims the benefit of U.S. Provisional Application No. 61/105,592, filed on Oct. 15, 2008. The disclosure of the above application is incorporated herein by reference in its entirety.

FIELD

The present disclosure relates to data storage systems and more particularly to writing and reading data via multiple read/write channels in parallel.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1A, a data storage system comprises a host 12 and a storage device 14. The storage device 14 comprises a controller 16 and a storage medium 18. The controller 16 controls the storage medium 18 and interfaces the storage device 14 to the host 12. The host 12 stores data on the storage medium 18.

Referring now to FIGS. 1B and 1C, examples of the data storage system 10 are shown. In FIG. 1B, a data storage system 20 comprises a host 22 and a hard disk drive (HDD) 24. The HDD 24 comprises a hard disk controller (HDC) 26 and a hard disk assembly (HDA) 28. The HDA 28 includes a magnetic storage medium (not shown) for storing data. The HDC 26 controls the HDA 28 and interfaces the HDD 24 to the host 22. The host 22 stores data on the magnetic medium included in the HDA 28.

In FIG. 1C, a data storage system 30 comprises a host 32 and a solid-state disk (SSD) 34. The SSD 34 comprises a solid-state disk (SSD) controller 36 and nonvolatile memory 38. The SSD controller 36 controls the nonvolatile memory 38 and interfaces the SSD 34 to the host 32. The host 32 stores data on the nonvolatile memory 38.

SUMMARY

A system comprises N first-in first-out (FIFO) modules, a buffer manager module, and N input/output (I/O) modules, where N is an integer greater than 1. The buffer manager module retrieves a set of N data units from a buffer and outputs the set of N data units to the N FIFO modules in parallel at a time, respectively. The N I/O modules receive the set of N data units from the N FIFOs in parallel, respectively, and output the N data units to a medium.

In other features, the system further comprises an encoder module and a buffer FIFO module. The encoder module encodes data received from a host and generates encoded data. The buffer FIFO module receives the encoded data and outputs the encoded data to the buffer manager module. The buffer manager module stores the encoded data in the buffer. The encoded data includes the set of N data units.

In other features, the set of N data units is a first set. The time is a first time. The N I/O modules receive a second set of N data units from the medium and output the second set of N data units to the N FIFO modules in parallel, respectively. The N FIFO modules output the second set of N data units to the buffer manager module in parallel at a second time, respectively. The buffer manager module stores the second set of N data units in the buffer.

In other features, the system further comprises a buffer FIFO module, a decoder module, a host FIFO module, and a host interface module. The buffer FIFO module receives the second set of N data units from the buffer manager module and outputs the second set of N data units. The decoder module receives the second set of N data units from the buffer FIFO module, decodes the second set of N data units, and generates decoded data. The host FIFO module receives the decoded data from the decoder module and outputs the decoded data. The host interface module receives the decoded data from the host FIFO module and outputs the decoded data to a host.

In still other features, a system comprises N input/output (I/O) modules, N first-in first-out (FIFO) modules, and a buffer manager module, where N is an integer greater than 1. The N I/O modules receive a set of N data units from a medium and output the set of N data units in parallel, respectively. The N FIFO modules receive the set of N data units in parallel and output the set of N data units in parallel at a time, respectively. The buffer manager module receives the set of N data units and stores the set of N data units in a buffer.

In other features, the system further comprises a buffer FIFO module, a decoder module, a host FIFO module, and a host interface module. The buffer FIFO module receives the set of N data units from the buffer manager module and outputs the set of N data units. The decoder module receives the set of N data units from the buffer FIFO module, decodes the set of N data units, and generates decoded data. The host FIFO module receives the decoded data from the decoder module and outputs the decoded data. The host interface module receives the decoded data from the host FIFO module and outputs the decoded data to a host.

In still other features, a method comprises retrieving a set of N data units from a buffer, where N is an integer greater than 1. The method further comprises outputting the set of N data units to N first-in first-out (FIFO) modules in parallel at a time, respectively. The method further comprises receiving the set of N data units from the N FIFOs in parallel at N input/output (I/O) modules, respectively. The method further comprises outputting the N data units from the N I/O modules to a medium.

In other features, the method further comprises receiving data from a host and generating encoded data by encoding the data, where the encoded data includes the set of N data units. The method further comprises receiving the encoded data at a buffer FIFO module and outputting the encoded data from the buffer FIFO module to a buffer manager module. The method further comprises storing the encoded data in the buffer.

In other features, the set of N data units is a first set, and the time is a first time. The method further comprises receiving a second set of N data units from the medium at the N I/O modules. The method further comprises outputting the second set of N data units from the N I/O modules to the N FIFO modules in parallel, respectively. The method further comprises outputting the second set of N data units from the N FIFO modules to the buffer manager module in parallel at a second time, respectively. The method further comprises storing the second set of N data units in the buffer.

In other features, the method further comprises receiving the second set of N data units at a buffer FIFO module from the buffer manager module and outputting the second set of N data units from a buffer FIFO module. The method further comprises receiving the second set of N data units from the buffer FIFO module and generating decoded data by decoding the second set of N data units. The method further comprises receiving the decoded data at a host FIFO module and outputting the decoded data from the host FIFO module. The method further comprises receiving the decoded data from the host FIFO module at a host interface module and outputting the decoded data from the host interface module to a host.

In still other features, a method comprises receiving a set of N data units from a medium at N input/output (I/O) modules, where N is an integer greater than 1. The method further comprises outputting the set of N data units in parallel from the N I/O modules, respectively. The method further comprises receiving the set of N data units in parallel at N first-in first-out (FIFO) modules. The method further comprises outputting the set of N data units in parallel at a time from the N FIFO modules, respectively. The method further comprises receiving the set of N data units at a buffer manager module and storing the set of N data units in a buffer.

In other features, the method further comprises receiving the set of N data units from the buffer manager module at a buffer FIFO module and outputting the set of N data units from the buffer FIFO module. The method further comprises receiving the set of N data units from the buffer FIFO module and generating decoded data by decoding the set of N data units. The method further comprises receiving the decoded data from the decoder module at a host FIFO module and outputting the decoded data from the host FIFO module. The method further comprises receiving the decoded data from the host FIFO module at a host interface module and outputting the decoded from the host interface module to a host.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 1A is a functional block diagram of a data storage system;

FIG. 1B is a functional block diagram of a data storage system comprising a hard disk drive (HDD);

FIG. 1C is a functional block diagram of a data storage system comprising a solid-state disk (SSD);

DESCRIPTION

Figure 2A:
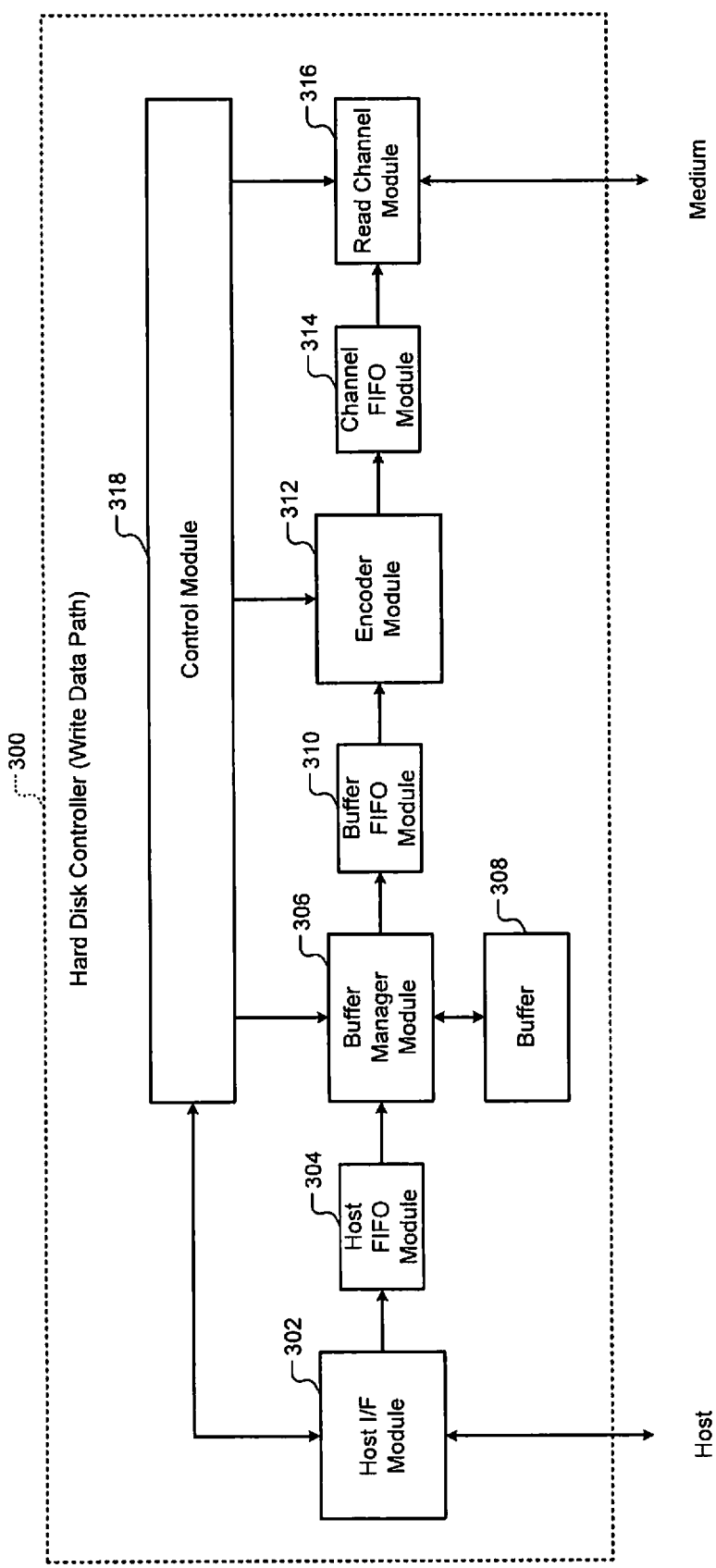
FIG. 2A is a functional block diagram of a hard disk controller (HDC) showing a write data path comprising a single read channel module.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In many data storage systems, a single read/write channel is typically used to transfer data between a host and a controller of a storage device. To increase system throughput, multiple read/write channels may be used to transfer data between the controller of the storage device and a storage medium of the storage device.

For example, in a hard disk drive (HDD), a hard disk controller (HDC) may use multiple read/write channel modules (hereinafter read channel modules) to transfer data to and from a magnetic medium. In a solid-state disk (SSD), a memory controller may use multiple read channel modules to transfer data to and from nonvolatile memory. Each read channel module may transfer a portion of data during read/write operations, thereby increasing throughput.

Typically, the multiple read channel modules are multiplexed. Multiplexing, however, increases the time taken to complete the write/read operations, thereby adversely affecting the throughput.

Instead, the present disclosure relates to a system that transfers data via multiple read channel modules in parallel. Accordingly, the write/read operations are completed faster and the throughput is greater than when the read channel modules are multiplexed. Additionally, as explained below in detail, the system provides data path protection from soft errors that is unavailable when the read channel modules are multiplexed.

The present disclosure is organized as follows. FIGS. 2A-2D show write and read operations performed using a single read channel module. FIGS. 3A-3D show write and read operations performed using multiplexed read channel modules. FIGS. 4A-4E show write and read operations performed using multiple read channels in parallel according to the teachings of the present disclosure.

Figure 2B:
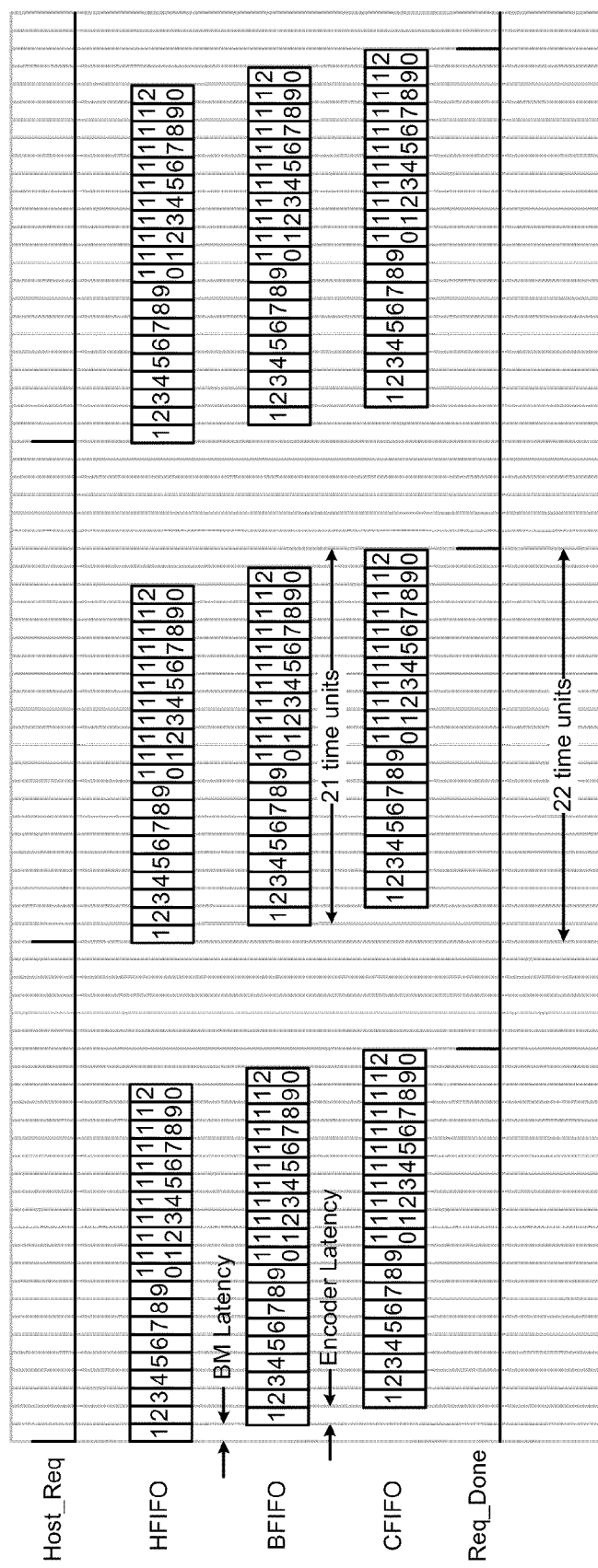
FIG. 2B is a timing diagram of a write operation performed by the HDC of FIG. 2A.
Figure 2C:
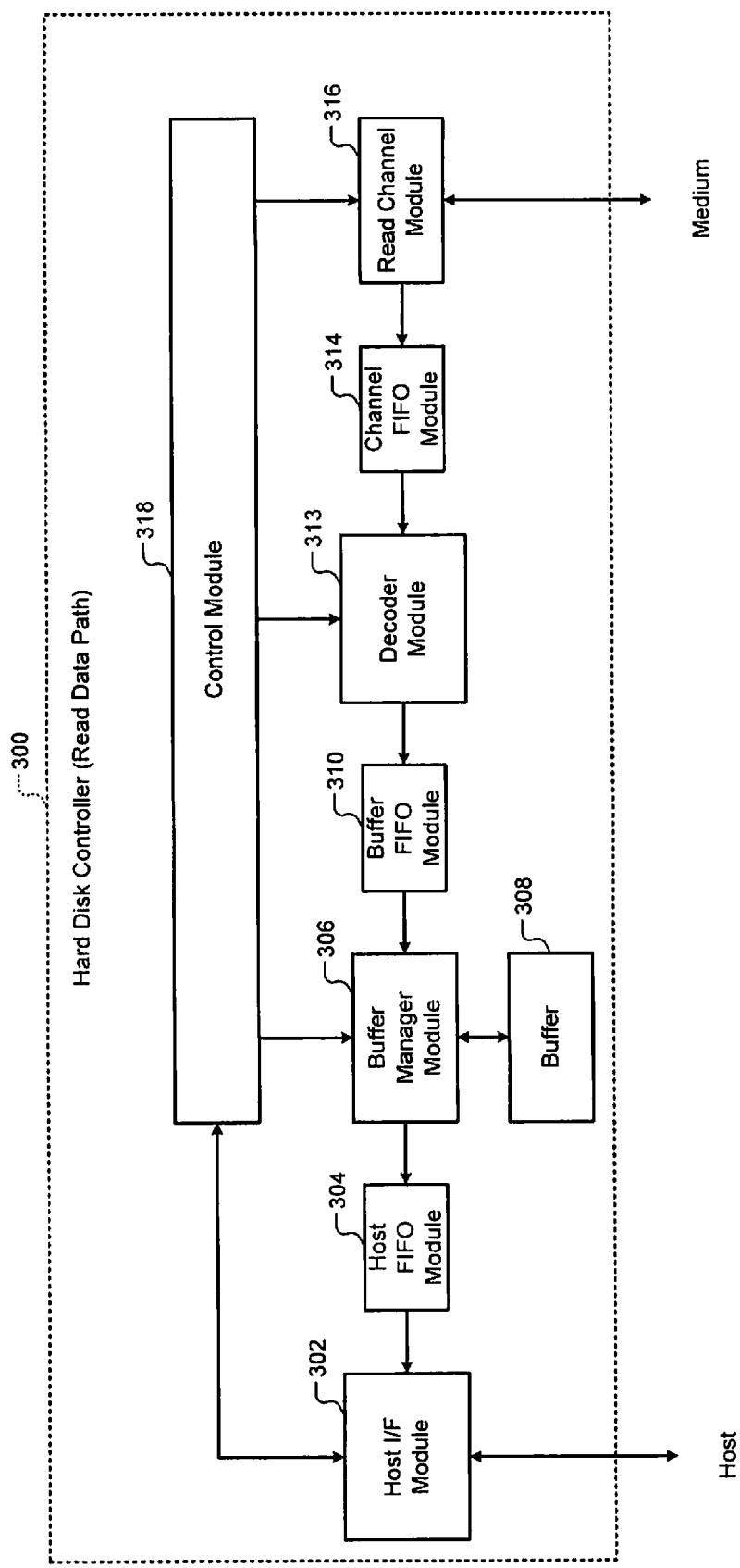
FIG. 2C is a functional block diagram of the HDC of FIG. 2A showing a read data path comprising the single read channel module.
Figure 2D:
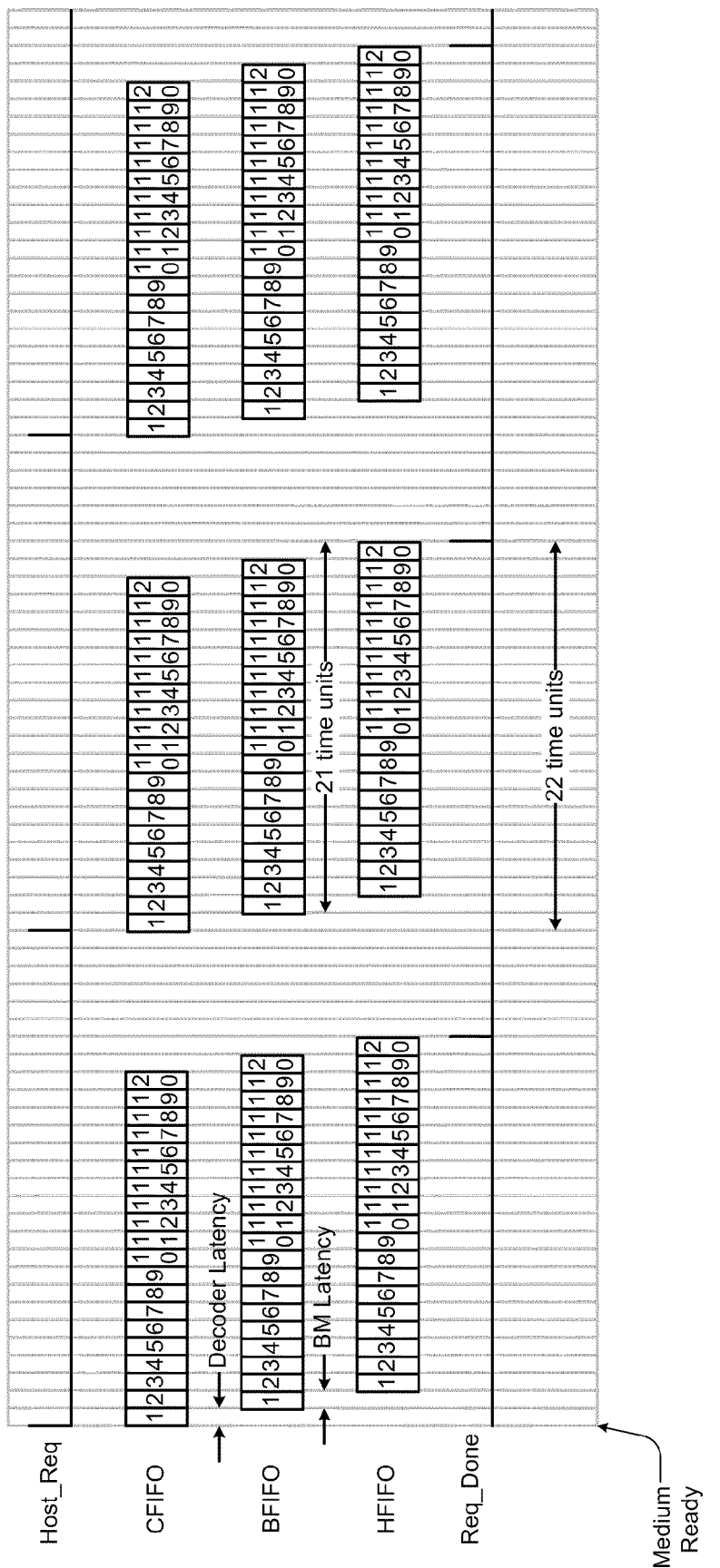
FIG. 2D is a timing diagram of a read operation performed by the HDC of FIG. 2C.

Referring now to FIGS. 2A-2D, write and read operations performed by a single-channel data storage system are shown. In FIGS. 2A and 2C, for example only, write and read data paths of a HDC 300 comprising a single read channel module are shown, respectively. In FIGS. 2B and 2D, timing diagrams of the write and read operations are shown, respectively.

In FIGS. 2A and 2C, the HDC 300 comprises a host interface module 302, a host first-in first-out (FIFO) module 304, a buffer manager module 306, a buffer 308, a buffer FIFO module 310, an encoder module 312 (shown in FIG. 2A but not in FIG. 2C), a decoder module 313 (shown in FIG. 2C but not in FIG. 2A), a channel FIFO module 314, a read channel module 316, and a control module 318.

In FIG. 2A, a write data path of the HDC 300 comprises the host interface module 302, the host FIFO module 304, the buffer manager module 306, the buffer 308, the buffer FIFO module 310, the encoder module 312, the channel FIFO module 314, the read channel module 316, and the control module 318.

The host interface module 302 interfaces the HDC 300 to a host (not shown). The host interface module 302 receives data from the host that is to be written on a medium (not shown). For example only, the medium may include the magnetic medium of the HDD. Alternatively, the medium may include nonvolatile memory of the SSD. The host FIFO module 304 receives the data from the host interface module 302 and outputs the data to the buffer manager module 306 on a first-in first-out basis.

The buffer manager module 306 controls the data transfer between the host FIFO module 304, the buffer 308, and the buffer FIFO module 310. The buffer manager module 306 may temporarily store the data in the buffer 308. The buffer 308 may comprise memory. For example only, the buffer 308 may comprise double-data-rate synchronous dynamic random access (DDR) memory.

Occasionally, the buffer manager module 306 may rearrange (e.g., sort) the data stored in the buffer 308. The buffer manager module 306 may retrieve the data from the buffer 308 and output the data to the buffer FIFO module 310. The buffer FIFO module 310 outputs the data to the encoder module 312 on a first-in first-out basis.

The encoder module 312 encodes the data and outputs encoded data to the channel FIFO module 314. The encoder module 312 may utilize a code to encode the data. For example only, the code may include an error correcting code (ECC). The channel FIFO module 314 outputs the encoded data to the read channel module 316 on a first-in first-out basis. The read channel module 316 writes the encoded data on the medium.

The control module 318 controls the host interface module 302, the buffer manager module 306, the encoder module 312, and the read channel module 316 during write operations. For example, the control module 318 may synchronize the host interface module 302, the buffer manager module 306, the encoder module 312, and the read channel module 316 during the write operations.

Additionally, the control module 318 exchanges control signals with the host via the host interface module 302. For example, the control module 318 receives read/write commands (e.g., Host_Req) from the host. The control module 318 generates control signals that control the flow of data between the host interface module 302 and the medium. For example, the control module 318 outputs control signals (e.g., Req_Done) to the host indicating the status of the read/write operations. The control module 318 may be implemented by hardware, firmware, and/or software. For example, in some implementations, the control module 318 may be implemented by a microprocessor that executes firmware and/or software.

In FIG. 2B, a timing diagram of a write operation performed by the HDC 300 via the write data path is shown. For example only, the timing diagram shows how a set of 20 sectors (20 blocks in SSD) is written on the medium. The control module 318 receives a request (Host_Req) to write data (e.g., the 20 sectors) on the medium. The host interface module 302 receives the 20 sectors from the host. The host FIFO module 304 may receive the 20 sectors in 20 time units after the control module 318 receives Host_Req (shown as HFIFO in FIG. 2B).

Each time unit is "one sector time," which is time needed to stream one sector into the channel FIFO module 314. Accordingly, a number of clock cycles in each time unit may be equal to a number of bytes in a sector. For example, when the sector size is 1 Kbytes, each time unit may be approximately equal to 1000 clock cycles.

The buffer manager module 306 may store and rearrange the 20 sectors in the buffer 308. The buffer manager module 306 may retrieve the 20 sectors from the buffer 308 and output the 20 sectors to the buffer FIFO module 310 (shown as BFIFO in FIG. 2B). The buffer FIFO module 310 may receive the 20 sectors in 20 time units after a delay due to a latency of the buffer manager module 306. For example, the latency of the buffer manager module 306 may be approximately one time unit as shown.

Alternatively, the buffer FIFO module 310 may receive the 20 sectors in 20 time units after a delay because the control module 318 may program the buffer manager module 306 to wait for a period of time before data is forwarded to the buffer FIFO module 310. For example, the control module 318 may program the buffer manager module 306 to wait while the 20 sectors are rearranged in the buffer 308. Accordingly, the buffer FIFO module 310 may receive the 20 sectors in approximately 21 time units after the control module 318 receives Host_Req.

The encoder module 312 encodes the 20 sectors and outputs 20 encoded sectors to the channel FIFO module 314. The channel FIFO module 314 receives the 20 encoded sectors in 20 time units after a delay due to a latency of the encoder module 312. For example, the latency of the encoder module 312 may be approximately one time unit as shown. Accordingly, the channel FIFO module 314 may receive the 20 encoded sectors in approximately 22 time units from the time of receipt of Host_Req (shown as CFIFO in FIG. 2B). The control module 318 outputs a request done (Req_Done) signal to the host when the channel FIFO module 314 receives the 20 encoded sectors.

The channel FIFO module 314 outputs the 20 encoded sectors to the read channel module 316. The read channel module 316 writes the 20 encoded sectors on the medium. Thus, the HDC 300 may write the 20 sectors on the medium via the write data path in approximately 22 time units after the control module 318 receives Host_Req. In other words, a completion time for completing a write operation of 20 sectors may be approximately 22 time units.

In FIG. 2C, a read data path of the HDC 300 comprises the host interface module 302, the host FIFO module 304, the buffer manager module 306, the buffer 308, the buffer FIFO module 310, the decoder module 313, the channel FIFO module 314, the read channel module 316, and the control module 318.

In FIG. 2D, a timing diagram of a read operation performed by the HDC 300 via the read data path is shown. For example only, the timing diagram shows how a set of 20 sectors (20 blocks in SSD) is read from the medium and output to the host. The control module 318 receives a request (Host_Req) to read data (e.g., the 20 sectors) from the medium. In the timing diagram, the medium is presumed ready for reading data (Medium Ready) when Host_Req is received. For example, the medium may be ready when a read head of the HDD is positioned over a track of the medium comprising the 20 sectors.

The read channel module 316 receives the 20 sectors read from the medium. The read channel module 316 may output the 20 sectors to the channel FIFO module 314 (shown as CFIFO in FIG. 2D). Specifically, the read channel module 316 receives data from the medium in a streaming manner. The read channel module 316 outputs the data to the channel FIFO module 314 also in the streaming manner until all 20 sectors have been output. The channel FIFO module 314 may receive the 20 sectors in 20 time units after the control module 318 receives Host_Req. The channel FIFO module 314 outputs the data from the 20 sectors to the decoder module 313 on a first-in first-out basis.

The decoder module 313 decodes the data from the 20 sectors and outputs 20 decoded sectors to the buffer FIFO module 310 (shown as BFIFO in FIG. 2D). The buffer FIFO module 310 receives the 20 decoded sectors in 20 time units after a delay due to a latency of the decoder module 313. For example, the latency of the decoder module 313 may be approximately one time unit as shown. Accordingly, the buffer FIFO module 310 may receive the 20 decoded sectors in approximately 21 time units after the control module 318 receives Host_Req. The buffer FIFO module 310 outputs the 20 decoded sectors to the buffer manager module 306 on a first-in first-out basis.

The buffer manager module 306 may store and rearrange the 20 decoded sectors in the buffer 308. The buffer manager module 306 may retrieve the 20 decoded sectors from the buffer 308 and output the 20 decoded sectors to the host FIFO module 304 (shown as HFIFO in FIG. 2D). The host FIFO module 304 may receive the 20 decoded sectors in 20 time units after a delay due to the latency of the buffer manager module 306. For example, the latency of the buffer manager module 306 may be approximately one clock cycle as shown. Accordingly, the host FIFO module 304 may receive the 20 decoded sectors in 22 time units after the control module 318 receives Host_Req. The control module 318 outputs a request done (Req_Done) signal to the host when the host FIFO module 304 receives the 20 decoded sectors.

The host FIFO module 304 outputs the 20 decoded sectors to the host interface module 302. The host interface module 302 outputs the 20 decoded sectors to the host. Thus, the HDC 300 may read the 20 sectors from the medium via the read data path and output the 20 sectors to the host in approximately 22 time units after the control module 318 receives Host_Req. In other words, a completion time for completing a read operation of 20 sectors may be approximately 22 time units.

Figure 3A:
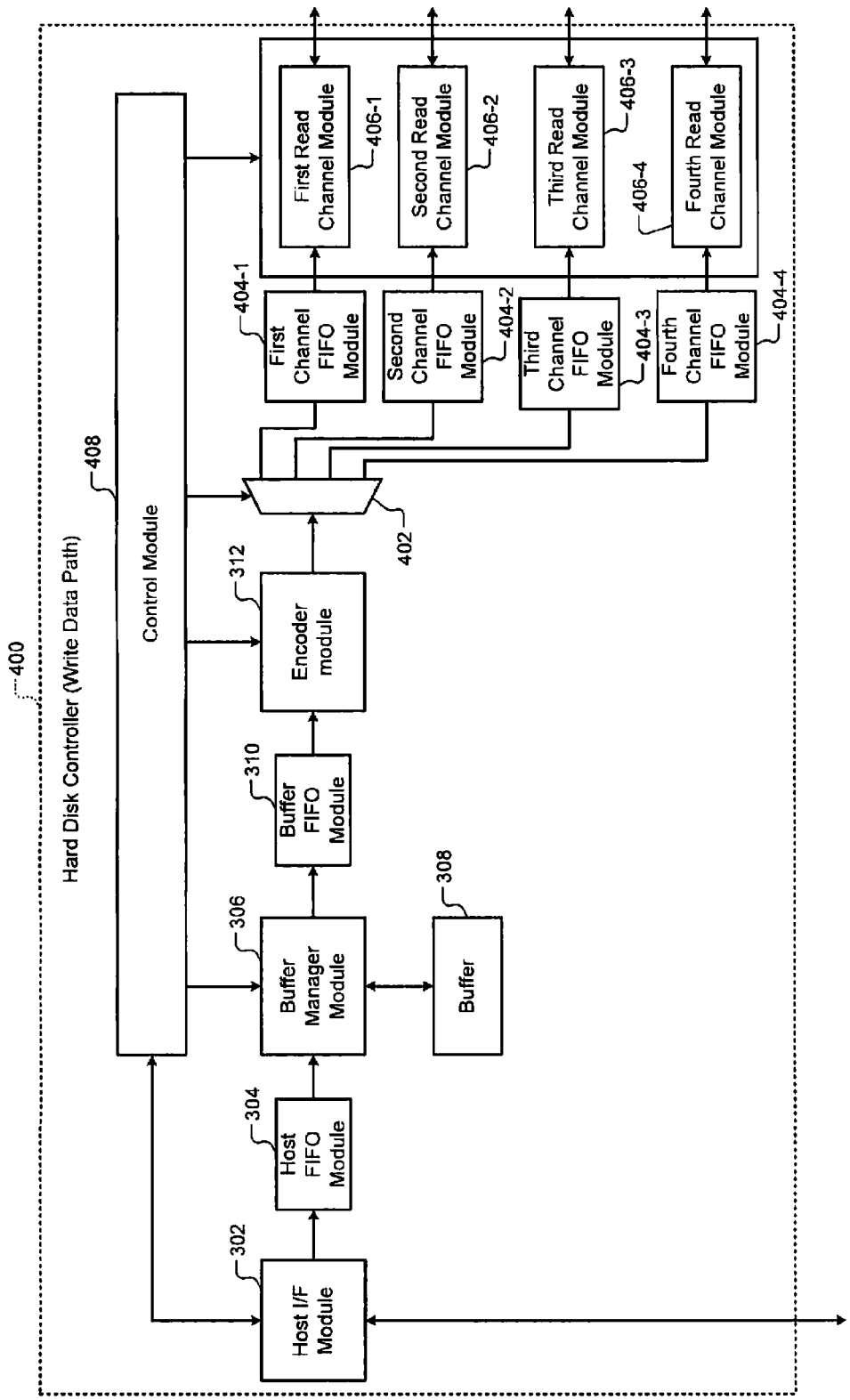
FIG. 3A is a functional block diagram of a HDC showing a write data path comprising multiplexed read channel modules.
Figure 3B:
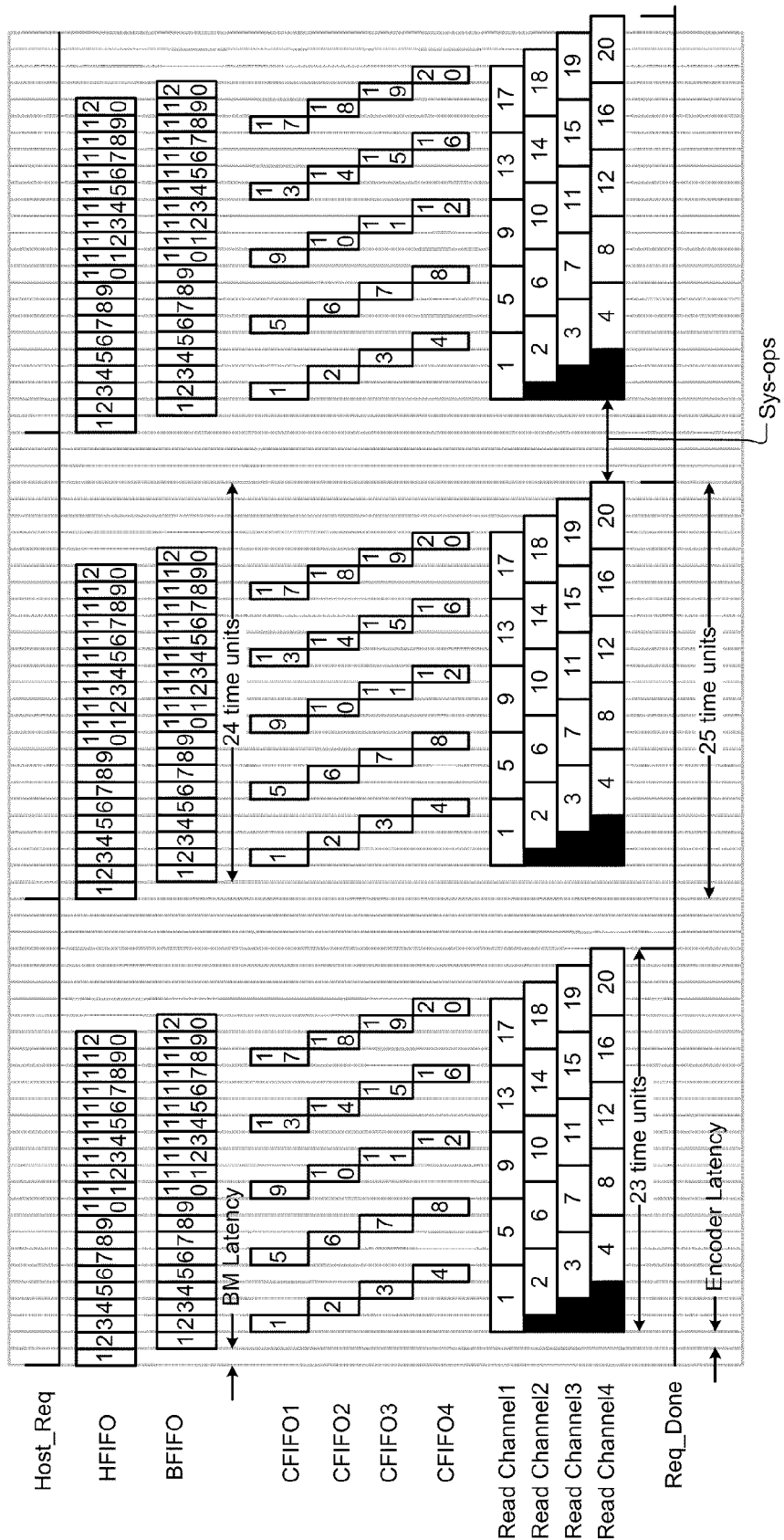
FIG. 3B is a timing diagram of a write operation performed by the HDC of FIG. 3A.
Figure 3C:
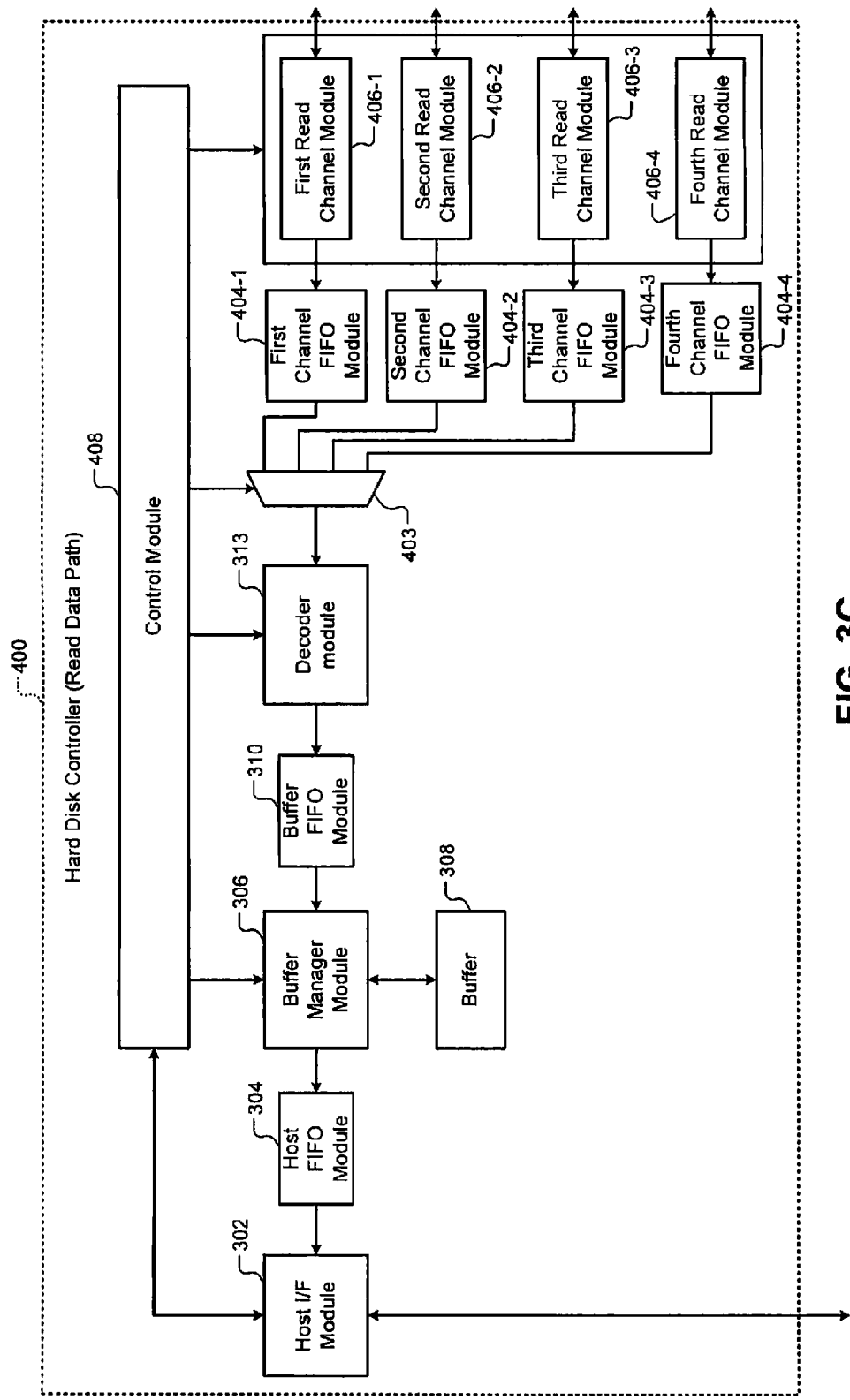
FIG. 3C is a functional block diagram of the HDC of FIG. 3A showing a read data path comprising the multiplexed read channel modules.
Figure 3D:
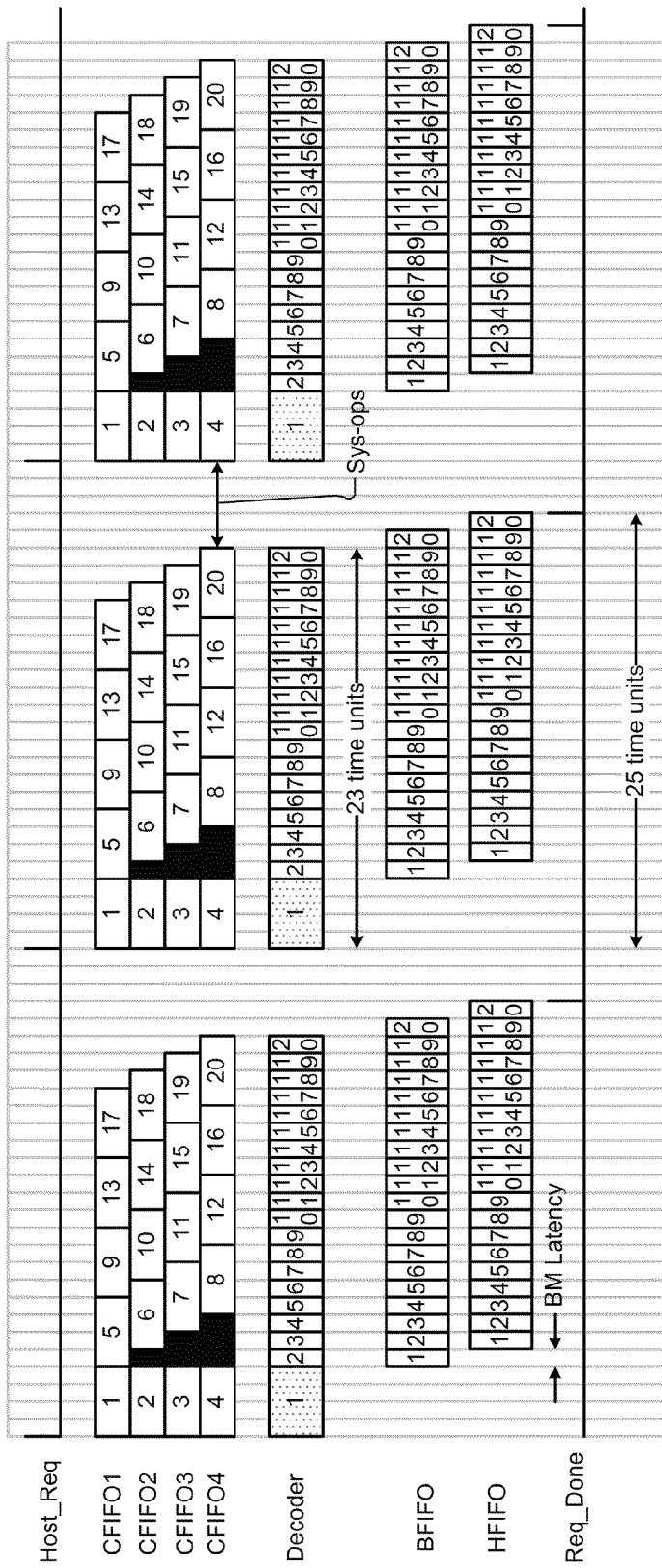
FIG. 3D is a timing diagram of a read operation performed by the HDC of FIG. 3C.

Referring now to FIGS. 3A-3D, write and read operations performed by a multi-channel data storage system are shown. The multi-channel data storage system uses multiplexed read channel modules to read and write data on the medium. In FIGS. 3A and 3C, for example only, write and read data paths of a HDC 400 are shown, respectively. The HDC 400 comprises multiple read channel modules that are multiplexed. In FIGS. 3B and 3D, timing diagrams of the write and read operations are shown, respectively.

In FIGS. 3A and 3C, the HDC 400 comprises the host interface module 302, the host FIFO module 304, the buffer manager module 306, the buffer 308, the buffer FIFO module 310, the encoder module 312 (shown in FIG. 3A but not in FIG. 3C), the decoder module 313 (shown in FIG. 3C but not in FIG. 3A), and a control module 408. Additionally, the HDC 400 comprises a 1-to-N demultiplexer 402 (shown in FIG. 3A but not in FIG. 3C), an N-to-1 multiplexer 403 (shown in FIG. 3C but not in FIG. 3A), N channel FIFO modules and N read channel modules, where N is an integer greater than 1.

For example only, N=4. When N=4, the HDC 400 may comprise a 1-to-4 demultiplexer 402 (shown in FIG. 3A but not in FIG. 3C) and a 4-to-1 multiplexer 403 (shown in FIG. 3C but not in FIG. 3A). Further, the HDC 400 may comprise first, second, third, and fourth channel FIFO modules 404-1, 404-2, 404-3, and 404-4 (collectively channel FIFO modules 404). Additionally, the HDC 400 may comprise first, second, third, and fourth read channel modules 406-1, 406-2, 406-3, and 406-4 (collectively read channel modules 406).

In FIG. 3A, a write data path of the HDC 400 comprises the host interface module 302, the host FIFO module 304, the buffer manager module 306, the buffer 308, the buffer FIFO module 310, the encoder module 312, the demultiplexer 402, the channel FIFO modules 404, the read channel modules 406, and the control module 408.

In FIG. 3B, a timing diagram of a write operation performed by the HDC 400 via the write data path is shown. For example only, the timing diagram shows how a set of 20 sectors (20 blocks in SSD) is written on the medium. The control module 408 receives a request (Host_Req) to write data (e.g., the 20 sectors) on the medium. The host interface module 302 receives the 20 sectors from the host. The host FIFO module 304 may receive the 20 sectors in 20 time units after the control module 408 receives Host_Req (shown as HFIFO in FIG. 3B).

The buffer manager module 306 may store and rearrange the 20 sectors in the buffer 308. The buffer manager module 306 may retrieve the 20 sectors from the buffer 308 and output the 20 sectors to the buffer FIFO module 310 (shown as BFIFO in FIG. 3B). The buffer FIFO module 310 may receive the 20 sectors in 20 time units after a delay due to the latency of the buffer manager module 306. For example, the latency of the buffer manager module 306 may be approximately one time unit as shown. Accordingly, the buffer FIFO module 310 may receive the 20 sectors in approximately 21 time units after the control module 408 receives Host_Req.

The encoder module 312 encodes the 20 sectors and outputs 20 encoded sectors to the demultiplexer 402. The demultiplexer 402 receives a first one of the 20 encoded sectors in 20 time units after a delay due to the latency of the encoder module 312. For example, the latency of the encoder module 312 may be approximately one time unit as shown. Accordingly, the demultiplexer 402 may receive the first one of the 20 encoded sectors in approximately 22 time units after the control module 408 receives Host_Req.

The control module 408 controls the demultiplexer 402. The demultiplexer 402 outputs first, second, third, and fourth ones of the 20 encoded sectors to the channel FIFO modules 404-1, 404-2, 404-3, and 404-4, respectively (shown as CFIFO in FIG. 3B). The outputs from the demultiplexer 402 may occur sequentially in four successive time units as shown.

The channel FIFO modules 404-1, 404-2, 404-3, and 404-4 output the first, second, third, and fourth ones of the 20 encoded sectors to the read channel modules 406-1, 406-2, 406-3, and 406-4, respectively. The read channel modules 406 write the first, second, third, and fourth ones of the 20 encoded sectors on the medium.

After transferring the fourth one of the 20 encoded sectors, the demultiplexer 402 outputs fifth, sixth, seventh, and eighth ones of the 20 encoded sectors. The channel FIFO modules 404 output the fifth, sixth, seventh, and eighth ones of the 20 encoded sectors to the read channel modules 406. The read channel modules 406 write the fifth, sixth, seventh, and eighth ones of the 20 encoded sectors on the medium. Thus, the 20 sectors are written on the medium. The control module 408 outputs a request done (Req_Done) signal to the host when the channel FIFO modules 404 receive the $20^{th}$ encoded sector.

Thus, the HDC 400 may write the 20 sectors on the medium via the write data path in approximately 25 time units from the time of receipt of Host_Req. In other words, a completion time for completing a write operation of 20 sectors may be approximately 25 time units. Despite having multiple channels, the HDC 400 takes longer than the HDC 300 to write the 20 sectors because of demultiplexing.

In the example shown, the read channel modules 406 may be busy writing data on the medium for approximately 23 time units. Additionally, the read channel modules 406 may remain idle during time units shown by shaded areas. The read channel modules 406 may remain idle due to sequential data transfer from the encoder module 312 to the channel FIFO modules 404 via the demultiplexer 402. Further, the control module 408 may perform system operations (e.g., bad-block management) during time units marked "sys-ops." Accordingly, the control module 408 may be unable to service the host during the time units marked "sys-ops." Consequently, system performance may degrade.

In FIG. 3C, a read data path of the HDC 400 comprises the host interface module 302, the host FIFO module 304, the buffer manager module 306, the buffer 308, the buffer FIFO module 310, the decoder module 313, the multiplexer 403, the channel FIFO modules 404, the read channel modules 406, and the control module 408.

In FIG. 3D, a timing diagram of a read operation performed by the HDC 400 via the read data path is shown. For example only, the timing diagram shows how a set of 20 sectors (20 blocks in SSD) is read from the medium and output to the host. The control module 408 receives a request (Host_Req) to read data (e.g., the 20 sectors) from the medium. In the timing diagram, the medium is presumed ready for reading data (Medium Ready) when Host_Req is received. For example, the medium may be ready when the read head of the HDD is positioned over a track of the medium comprising the 20 sectors.

The read channel modules 406 receive the 20 sectors read from the medium. The read channel modules 406 output the 20 sectors to the channel FIFO modules 404 (shown as CFIFO in FIG. 3D). The channel FIFO modules 404 output the 20 sectors to the multiplexer 403. The control module 408 controls the multiplexer 403. The multiplexer 403 outputs the 20 sectors to the decoder module 313.

The decoder module 313 decodes the data from the 20 sectors and outputs 20 decoded sectors to the buffer FIFO module 310 (shown as BFIFO in FIG. 3D). The buffer FIFO module 310 receives the 20 decoded sectors in 20 time units after a delay due to multiplexing. For example, the delay may be approximately four time units in the example shown. Accordingly, the buffer FIFO module 310 may receive the 20 decoded sectors in approximately 24 time units after the control module 408 receives Host_Req. The buffer FIFO module 310 outputs the 20 decoded sectors to the buffer manager module 306.

The buffer manager module 306 may store and rearrange the 20 decoded sectors in the buffer 308. The buffer manager module 306 may retrieve the 20 decoded sectors from the buffer 308 and output the 20 decoded sectors to the host FIFO module 304 (shown as HFIFO in FIG. 3D). The host FIFO module 304 may receive the 20 decoded sectors in 20 time units after a delay due to the latency of the buffer manager module 306. For example, the latency of the buffer manager module 306 may be approximately one clock cycle as shown. Accordingly, the host FIFO module 304 may receive the 20 decoded sectors in 25 time units after the control module 408 receives Host_Req. The control module 408 outputs a request done (Req_Done) signal to the host when the host FIFO module 304 receives the 20 decoded sectors.

The host FIFO module 304 outputs the 20 decoded sectors to the host interface module 302. The host interface module 302 outputs the 20 decoded sectors to the host. Thus, the HDC 400 may read the 20 sectors from the medium via the read data path and output the 20 sectors to the host in approximately 25 time units after the control module 408 receives Host_Req. In other words, a completion time for completing a read operation of 20 sectors may be approximately 25 time units. Despite having multiple channels, the HDC 400 takes longer than the HDC 300 to read the 20 sectors because of multiplexing.

In the example shown, the read channel modules 406 may be busy reading data from the medium for approximately 23 time units. Additionally, the read channel modules 406 may remain idle during time units shown by shaded areas. The read channel modules 406 may remain idle due to sequential data transfer from the channel FIFO modules 404 to the decoder module 313 via the multiplexer 403. Further, the control module 408 may perform system operations (e.g., bad-block management) during time units marked "sys-ops." Accordingly, the control module 408 may be unable to service the host during the time units marked "sys-ops." Consequently, system performance may degrade.

Thus, multiplexing the read channel modules 406 may delay completion of the write and read operations. Delays due to multiplexing shown by the shaded areas may be particularly noticeable when multiple write and read operations of short durations are performed. The delays due to multiplexing may be eliminated by using the read channel modules 406 in parallel during the write and read operations.

Typically, the host may view the buffer manager module 306 and the buffer 308 as a cache. Accordingly, from the host end, an effective completion time for the write and read operations may be measured as follows. The effective completion time for write operations may be measured as the time taken to transfer data from the buffer 308 to the medium. Additionally, the effective completion time for read operations may be measured as the time taken to transfer data from the medium to the buffer 308. The effective completion times for write and read operations may be improved by configuring portions of the write and read data paths as follows.

Figure 4A:
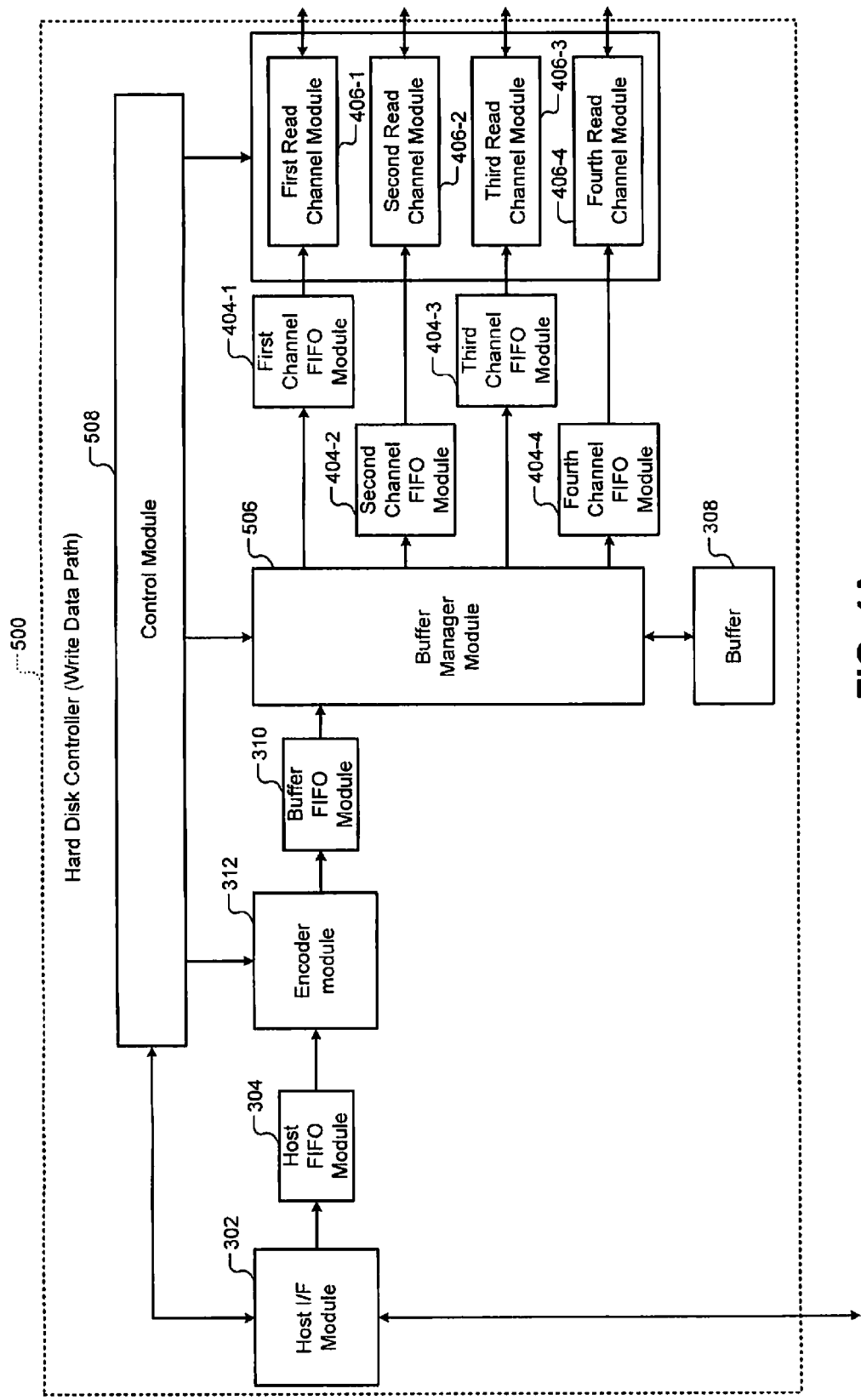
FIG. 4A is a functional block diagram of a HDC showing a write data path comprising multiple read channel modules.
Figure 4B:
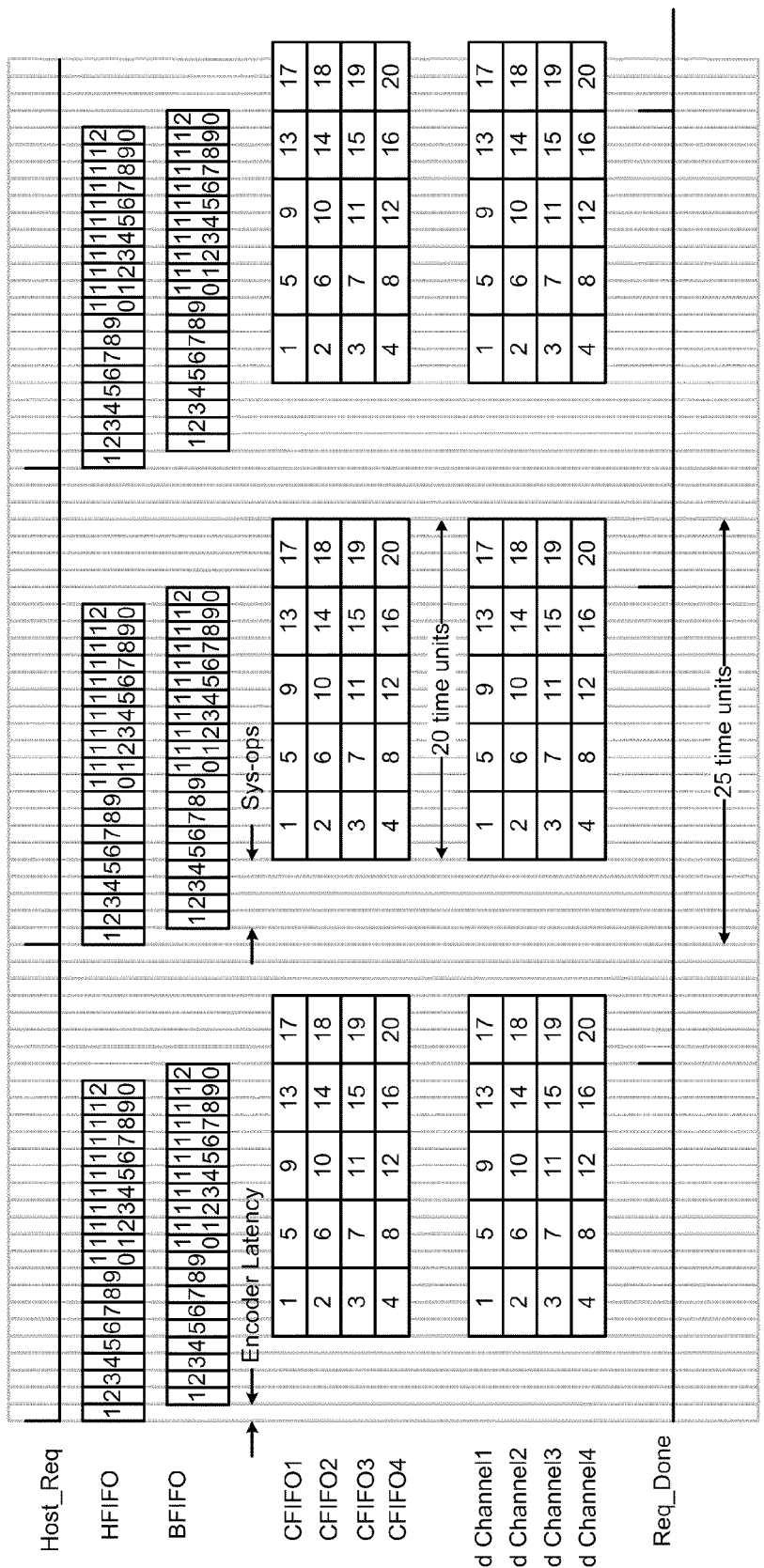
FIG. 4B is a timing diagram of a write operation performed by the HDC of FIG. 4A.
Figure 4C:
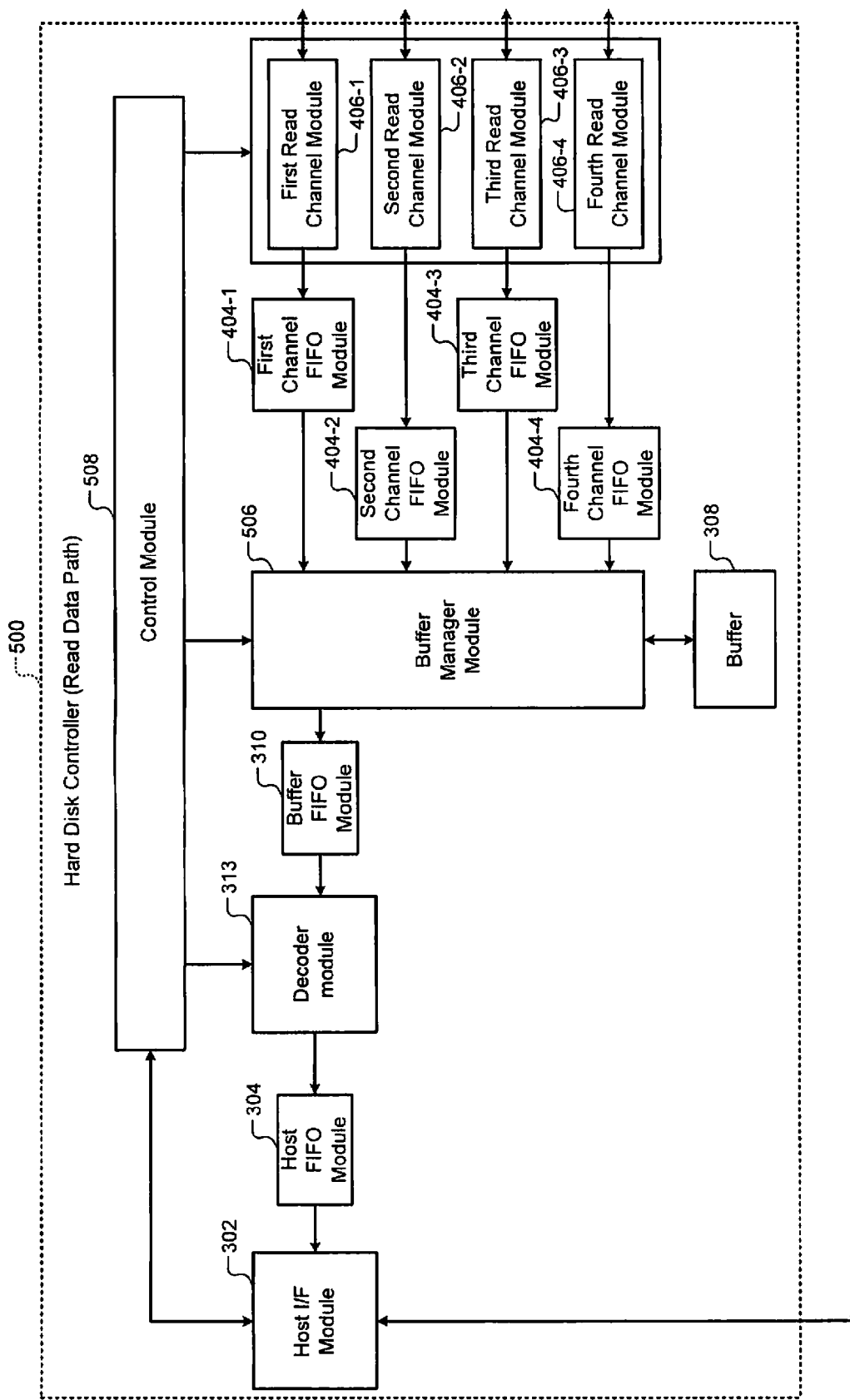
FIG. 4C is a functional block diagram of the HDC of FIG. 4A showing a read data path comprising the multiple read channel modules.
Figure 4D:
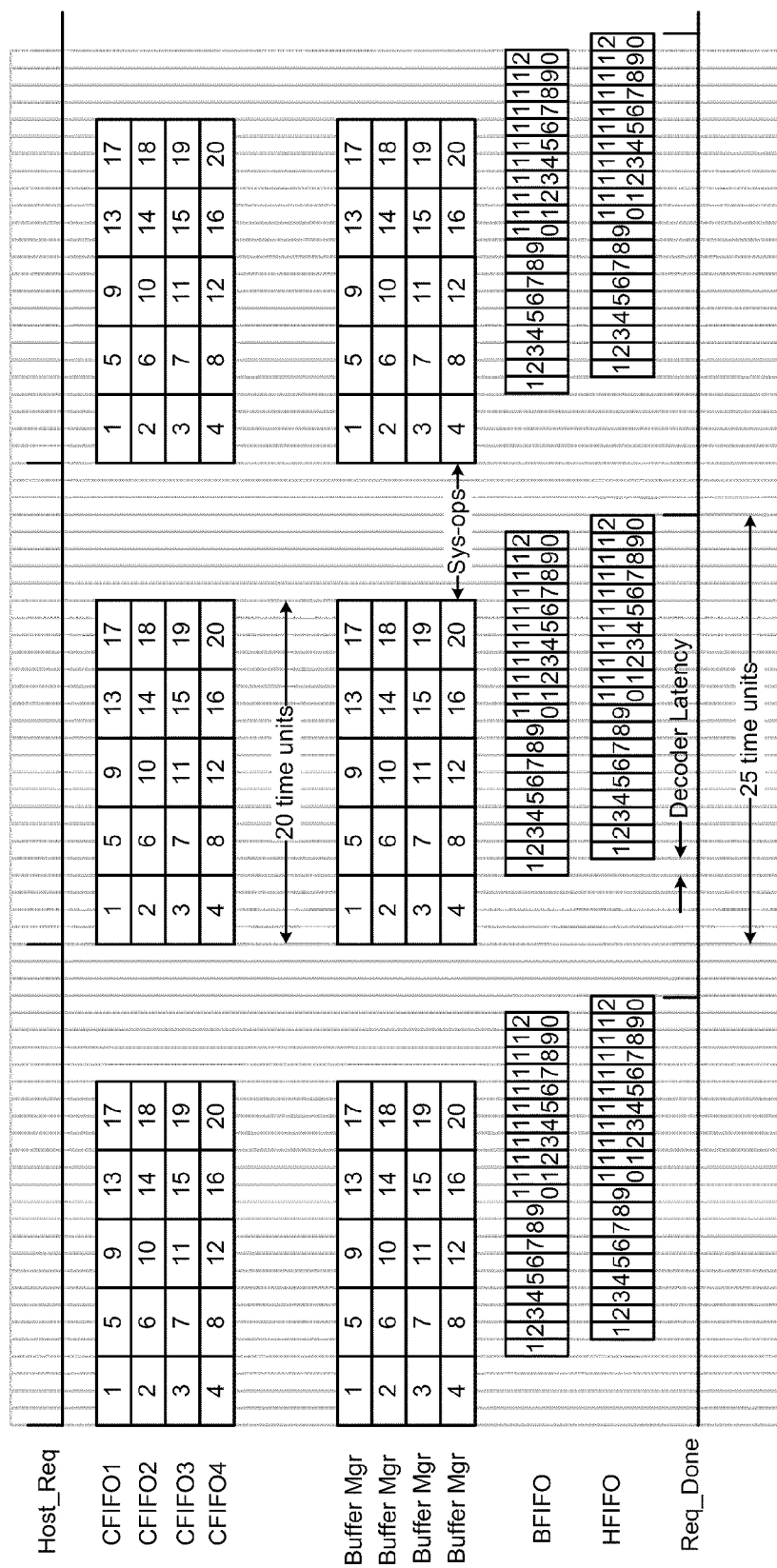
FIG. 4D is a timing diagram of a read operation performed by the HDC of FIG. 4C.
Figure 4E:
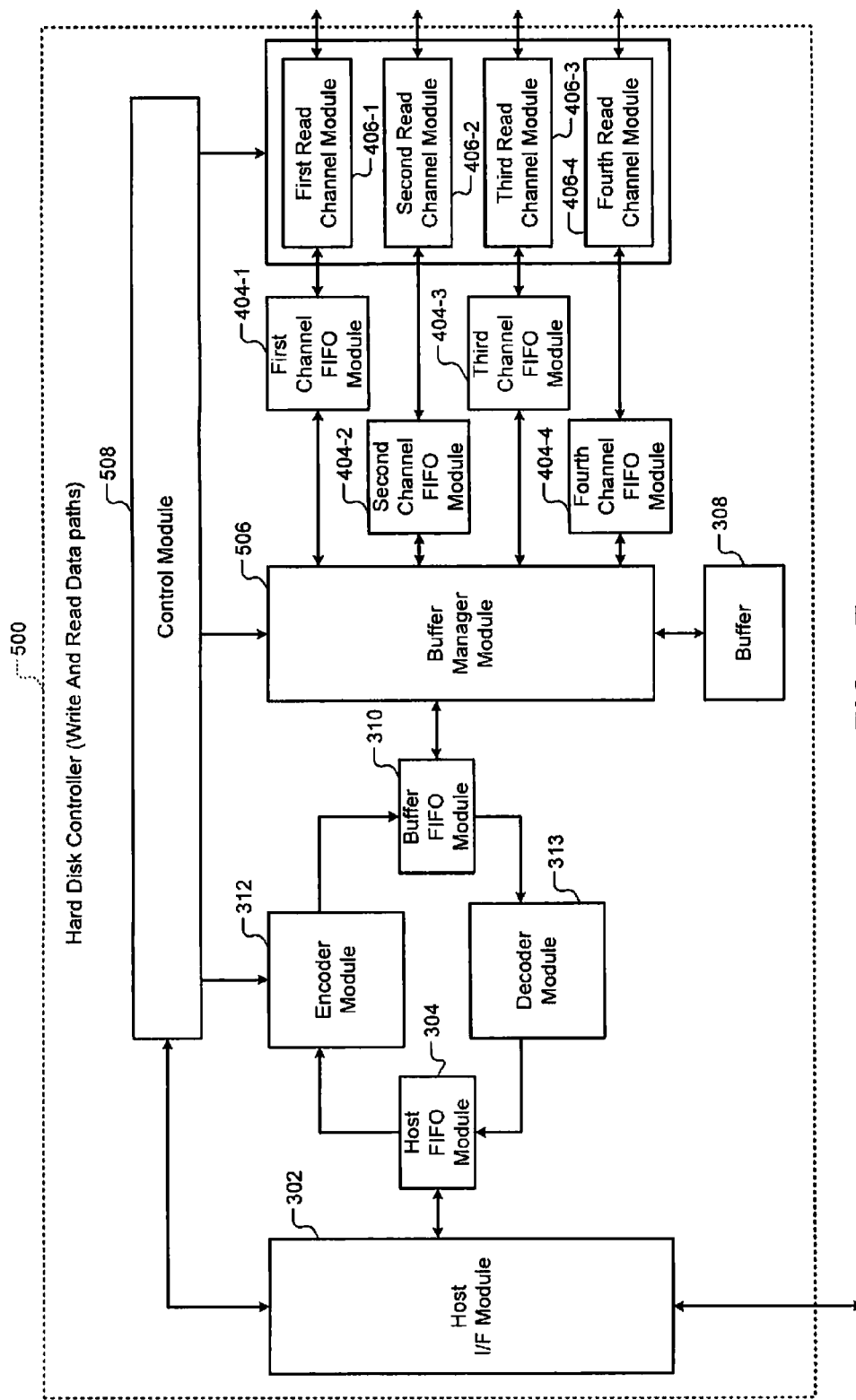
FIG. 4E is a functional block diagram of the HDC of FIG. 4A showing the write and read data paths.

Referring now to FIGS. 4A-4E, write and read operations performed by a multi-channel data storage system are shown. The multi-channel data storage system uses multiple read channel modules to read and write data in parallel according to the teachings of the present disclosure. In FIGS. 4A and 4C, for example only, write and read data paths of a HDC 500 are shown, respectively. The HDC 500 comprises multiple read channel modules. The HDC 500 uses the multiple read channel modules in parallel to perform the write and read operations. In FIGS. 4B and 4D, timing diagrams of the write and read operations are shown, respectively. In FIG. 4E, combined write and read data paths of the HDC 500 are shown.

In FIGS. 4A, 4C, and 4E, the HDC 500 comprises the host interface module 302, the host FIFO module 304, the encoder module 312 (shown in FIG. 4A but not in FIG. 4C), the decoder module 313 (shown in FIG. 4C but not in FIG. 4A), the buffer FIFO module 310, a buffer manager module 506, the buffer 308, and a control module 508. Additionally, the HDC 500 comprises the N channel FIFO modules and the N read channel modules, where N is an integer greater than 1. For example only, N=4. When N=4, the HDC 500 may comprise the channel FIFO modules 404 and the read channel modules 406.

In FIG. 4A, a write data path of the HDC 500 comprises the host interface module 302, the host FIFO module 304, the encoder module 312, the buffer FIFO module 310, the buffer manager module 506, the buffer 308, the channel FIFO modules 404, the read channel modules 406, and the control module 508.

The control module 508 controls the encoder module 312, the buffer manager module 506, and the read channel modules 406 during write operations. The control module 508 generates control signals that control the flow of data between the host interface module 302 and the medium during read/write operations. For example, the control module 508 may output signals that synchronize the encoder module 312, the buffer manager module 506, and the read channel modules 406 during the read/write operations.

Additionally, the control module 508 exchanges control signals with the host via the host interface module 302. For example, the control module 508 receives read/write commands (e.g., Host_Req) from the host. Further, the control module 508 outputs control signals (e.g., Req_Done) to the host indicating the status of the read/write operations.

In FIG. 4B, a timing diagram of a write operation performed by the HDC 500 via the write data path is shown. For example only, the timing diagram shows how a set of 20 sectors (20 blocks in SSD) is written on the medium. For example only, the medium may include the magnetic medium of the HDD or nonvolatile memory of the SSD. The control module 508 receives a request (Host_Req) from the host to write data (e.g., the 20 sectors) on the medium.

The host interface module 302 interfaces the HDC 500 to the host and receives the 20 sectors to be written on the medium from the host. The host FIFO module 304 receives the 20 sectors from the host via the host interface module 302 (shown as HFIFO in FIG. 4B). The host FIFO module 304 may receive the 20 sectors in 20 time units after the control module 508 receives Host_Req. The host FIFO module 304 outputs the 20 sectors to the encoder module 312 on a first-in first-out basis.

The encoder module 312 encodes data from the 20 sectors and outputs 20 sectors of encoded data to the buffer FIFO module 310 (shown as BFIFO in FIG. 4B). The encoder module 312 may utilize a code to encode the data. For example only, the code may include an error correcting code (ECC).

The buffer FIFO module 310 may receive the 20 sectors in 20 time units after a delay due to the latency of the encoder module 312. For example, the latency of the encoder module 312 may be approximately one time unit as shown. Accordingly, the buffer FIFO module 310 may receive the 20 sectors in approximately 21 time units after the control module 508 receives Host_Req. The buffer FIFO module 310 outputs the 20 sectors to the buffer manager module 506 on a first-in first-out basis.

The buffer manager module 506 may store and rearrange the 20 sectors in the buffer 308. The control module 508 outputs a request done (Req_Done) signal to the host when the buffer manager module 506 stores the 20$^{th}$ sector in the buffer 308. Accordingly, the host need not wait until the HDC 500 actually finishes writing the 20 sectors on the medium.

The HDC 500 writes the 20 sectors on the medium as follows. The buffer manager module 506 may retrieve the 20 sectors from the buffer 308 and output the 20 sectors to the channel FIFO modules 404. In the example shown, the buffer manager module 506 outputs sectors 1 through 4 in parallel at a first time to the channel FIFO modules 404-1, 404-2, 404-3, and 404-4, respectively (shown as CFIFO1 to CFIFO4, respectively, in FIG. 4B).

Thereafter, the buffer manager module 506 outputs sectors 5 through 8 in parallel at a second time to the channel FIFO modules 404-1, 404-2, 404-3, and 404-4, respectively, etc. Thus, the buffer manager module 506 outputs the 20 sectors to the channel FIFO modules 404, four sectors at a time, in approximately 20 time units as shown.

The buffer manager module 506 may begin transferring data from the buffer 308 to the channel FIFO modules 404 as soon as first four of the 20 sectors are stored in the buffer 308. Thus, the buffer manager module 506 may transfer the 20 sectors from the buffer 308 to the channel FIFO modules 404 in approximately 25 time units after the control module 508 receives Host-Req.

The channel FIFO modules 404-1, 404-2, 404-3, and 404-4 may output sectors 1 through 4 in parallel at the first time to the read channel modules 406-1, 406-2, 406-3, and 406-4, respectively. Thereafter, the channel FIFO modules 404-1, 404-2, 404-3, and 404-4 may output sectors 5 through 8 in parallel at the second time to the read channel modules 406-1, 406-2, 406-3, and 406-4, respectively, and so on.

There may be no or negligible latency between a time when the channel FIFO modules 404 receive sectors 1 through 4 and a time when the read channel modules 406 receive sectors 1 through 4. Accordingly, the read channel modules 406 may write sectors 1 through 4 on the medium approximately at the first time. Thereafter, the read channel modules 406 may write sectors 5 through 8 on the medium approximately at the second time, and so on.

Thus, the read channel modules 406 may finish writing the 20 sectors on the medium in approximately 20 time units after the buffer manager module 506 begins transferring the sectors from the buffer 308 to the channel FIFO modules 404. Accordingly, the effective completion time to write the 20 sectors for the HDC 500 is 20 time units, which is less than the 25 and 22 time units taken by the HDC 400 and the HDC 300, respectively.

As shown, the read channel modules 406 may be busy writing data on the medium for approximately 20 time units, which are less than 23 time units in the HDC 400. Thus, the HDC 500 transfers data from the buffer 308 to the read channel modules 406 faster than the HDC 400. Accordingly, the HDC 500 may have more time units to perform the system operations than the HDC 400. Alternatively or additionally, the HDC 500 may service the host during the time units marked "sys-ops." Thus, the HDC 500 uses the read channel modules 406 more efficiently, thereby yielding higher throughput than the HDC 400 and the HDC 300.

In FIG. 4C, a read data path of the HDC 500 comprises the host interface module 302, the host FIFO module 304, the decoder module 313, the buffer FIFO module 310, the buffer manager module 506, the buffer 308, the channel FIFO modules 404, the read channel modules 406, and the control module 508.

The control module 508 controls the decoder module 313, the buffer manager module 506, and the read channel modules 406 during read operations. The control module 508 generates control signals that control the flow of data between the host interface module 302 and the medium during the read operations. For example, the control module 508 may output signals that synchronize the decoder module 313, the buffer manager module 506, and the read channel modules 406 during the read operations.

In FIG. 4D, a timing diagram of a read operation performed by the HDC 500 via the read data path is shown. For example only, the timing diagram shows how a set of 20 sectors (20 blocks in SSD) is read from the medium and output to the host. The control module 508 receives a request (Host_Req) to read data (e.g., the 20 sectors) from the medium. In the timing diagram, the medium is presumed ready for reading data (Medium Ready) when the Host_Req is received. For example, the medium may be ready when the read head of the HDD is positioned over a track of the medium comprising the 20 sectors.

The read channel modules 406 receive the 20 sectors from the medium. The read channel modules 406 output the 20 sectors in parallel to the channel FIFO modules 404 (shown as CFIFO1 to CFIFO4, respectively, in FIG. 4D). The channel FIFO modules 404 output the 20 sectors in parallel to the buffer manager module 506 as follows.

The read channel modules 406-1, 406-2, 406-3, and 406-4 output sectors 1 through 4 in parallel at a first time to the channel FIFO modules 404-1, 404-2, 404-3, and 404-4, respectively. The first time may be the time when the control module 508 receives Host_Req. Thereafter, the read channel modules 406-1, 406-2, 406-3, and 406-4 output sectors 5 through 8 in parallel at a second time to the channel FIFO modules 404-1, 404-2, 404-3, and 404-4, respectively, and so on. Thus, the read channel modules 406 may output the 20 sectors to the channel FIFO modules 404 in approximately 20 time units after the control module 508 receives Host_req.

The channel FIFO modules 404-1, 404-2, 404-3, and 404-4 output sectors 1 through 4 in parallel at the first time to the buffer manager module 506, respectively. Thereafter, the channel FIFO modules 404-1, 404-2, 404-3, and 404-4 output sectors 5 through 8 in parallel at the second time to the buffer manager module 506, respectively, and so on. Thus, the channel FIFO modules 404 output the sectors to the buffer manager module 506 in approximately 20 time units.

There may be no or negligible latency between a time when the channel FIFO modules 404 receive a set of sectors and a time when the buffer manager module 506 receives the set of sectors. Accordingly, the buffer manager module 506 may receive the $20^{th}$ sector in approximately 20 time units after the control module 508 receives Host_Req. In other words, the effective completion time to read the 20 sectors for the HDC 500 is 20 time units, which is less than the time taken by the HDC 400 and the HDC 300, respectively.

The buffer manager module 506 may store and rearrange the 20 sectors in the buffer 308. Thereafter, the buffer manager module 506 may retrieve and output the 20 sectors to the buffer FIFO module 310 (shown as BFIFO in FIG. 4D). The buffer FIFO module 310 may output the 20 sectors to the decoder module 313. The decoder module 313 may decode the 20 sectors and output 20 decoded sectors to the host FIFO module 304 (shown as HFIFO in FIG. 4D).

The host FIFO module 304 may receive the 20 decoded sectors in 20 time units after a delay due to the latency of the decoder module 313. For example, the latency of the decoder module 313 may be approximately one time unit as shown. Accordingly, the host FIFO module 304 may receive the 20 sectors in approximately 25 time units after the control module 508 receives Host_Req.

The host FIFO module 304 outputs the 20 sectors to the host interface module 302 on a first-in first-out basis. The control module 508 outputs a Req_Done signal to the host when host FIFO module 304 outputs the $20^{th}$ sector to the host interface module 302. Thus, the HDC 500 may read the 20 sectors from the medium and output the 20 sectors to the host in approximately 25 time units after the control module 508 receives Host_Req.

In FIG. 4E, combined write and read data paths of the HDC 500 are shown. That is, the HDC 500 shown in FIG. 4E comprises all the elements of the write and read data paths of the HDC 500 shown in FIGS. 4A and 4C, respectively. Accordingly, the description of FIGS. 4A and 4C is not repeated to describe 4E.

In the example shown, the read channel modules 406 may be busy reading data from the medium for approximately 20 time units, which are less than the time units in the HDC 400 and the HDC 300. Thus, the HDC 500 transfers data from the read channel modules 406 to the buffer 308 faster than the HDC 400 and the HDC 300. Accordingly, the HDC 500 may have more time units to perform the system operations than the HDC 400. The HDC 500 may perform the system operations during the time units marked "sys-ops." Thus, the HDC 500 uses the read channel modules 406 more efficiently, thereby yielding higher throughput than the HDC 400 and the HDC 300.

In addition to improved effective completion times, the HDC 500 offers data path protection for the write and read data paths. Specifically, the HDC 500 protects the write and read data paths from soft errors. Typically, the buffer 308 uses dynamic random access memory (DRAM) while the host FIFO module 304, the buffer FIFO module 310, and the channel FIFO modules 404 use static RAM (SRAM). Due to different electrical characteristics (e.g., architecture and timing) of DRAM and SRAM, soft errors may occur in data transfers along the write and read data paths. The encoder module 312 and the decoder module 313 protect the write and read data paths from the soft errors, respectively.

More specifically, in the write data path, the encoder module 312 encodes the data received from the host via the host FIFO module 304 using an error correcting code. Thus, the encoder module 312 corrects soft errors, if any, in the data before the data is stored in the buffer 308. Additionally, in the read data path, the decoder module 313 decodes the data received from the buffer 308 via the buffer FIFO module 310 using the error correcting code. Thus, the decoder module 313 corrects soft errors, if any, in the data before the data is output to the host.

Throughout the present disclosure, the HDD is used as an example only. The teachings of the present disclosure may apply to other data storage devices including SSDs. Generally, the teachings may apply to systems that transmit and receive data via multiple channels in parallel.

For example, the teachings may apply to communication devices that communicate over a medium via multiple transceivers. The multiple transceivers may transmit and receive data in parallel. Each of the transceivers may communicate with the medium via a respective antenna. The medium may include a wireline or a wireless medium. Thus, in the communication devices, the transceivers may replace the read channel modules 406 shown in the HDC 500.

Additionally, the teachings may apply to multi-channel signal processing systems. Each channel may comprise an analog-to-digital converter (ADC) or a digital-to-analog-converter (DAC). The channels may process data in parallel. Thus, in the signal processing systems, the ADCs or the DACs may replace the read channel modules 406 shown in the HDC 500.

Considering the general applicability of the teachings, the read channel modules 406 shown in the HDC 500 may be generally called input/output (I/O) modules. Thus, in storage devices (e.g., in HDDs and SSDs), the I/O modules may include the read channel modules 406 that read/write data. In the communication devices, the I/O modules may include the transceivers that transmit/receive data. In the signal processing systems, the I/O modules may include the ADCs or the DACs.

Further, the systems and devices mentioned above may be implemented as a system-on-chip (SOC). For example, the HDC 500 may be implemented as a SOC. The communication devices comprising the transceivers may be implemented as SOCs. The signal processing systems comprising the ADCs or the DACs may be implemented as SOCs. Generally, the systems and devices comprising the I/O modules may be implemented as SOCs.

Figure 5A:
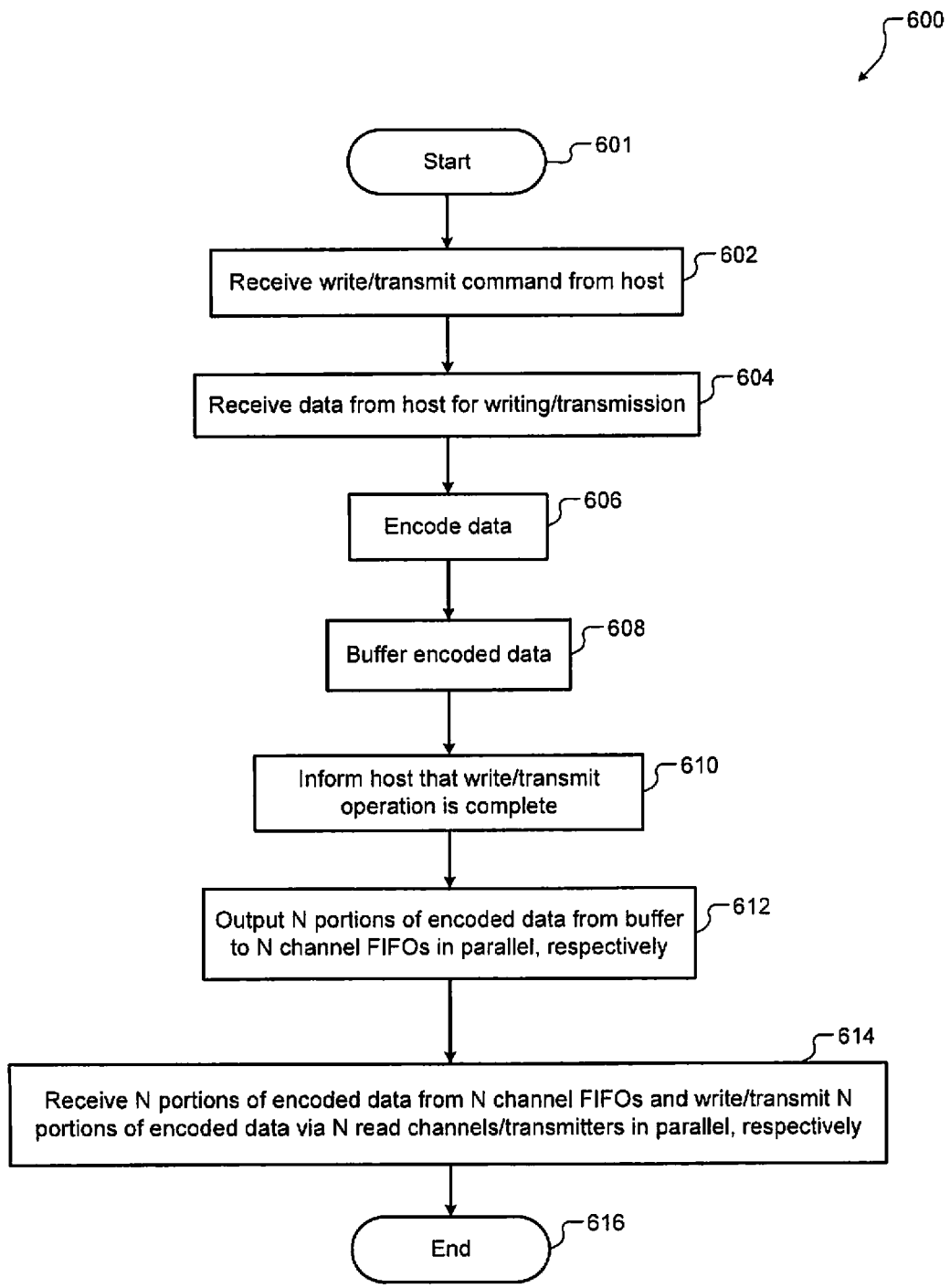
FIG. 5A is a flowchart of a method for writing/transmitting data to a medium.

Referring now to FIG. 5A, exemplary steps of a method 600 for writing/transmitting data to a medium according to the present disclosure are shown. Control begins at 601. At 602, control receives a write/transmit command from the host. At 604, control receives data for writing/transmitting from the host. At 606, control encodes the data and generates encoded data. At 608, control stores the encoded data in buffer. At 610, control informs the host that the write/transmit operation is complete.

At 612, control outputs N portions of the encoded data from the buffer to N channel FIFOs in parallel, respectively, where N is an integer greater than 1. For example, the N portions may include N sectors or N blocks. At 614, control receives the N portions from the N channel FIFOs and writes/transmits the N portions in parallel via N read channels/transmitters, respectively. Control ends at 616.

Figure 5B:
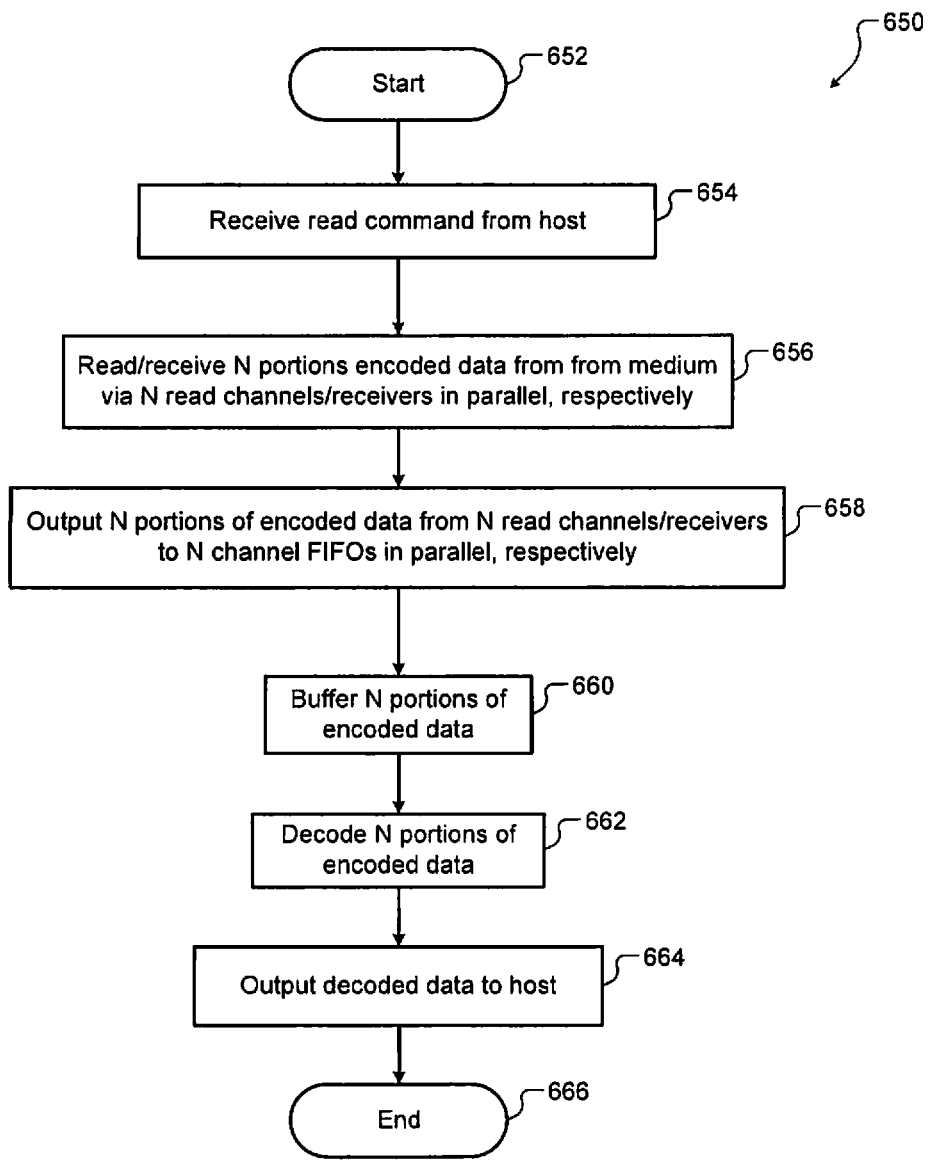
FIG. 5B is a flowchart of a method for reading/receiving data from the medium.

Referring now to FIG. 5B, exemplary steps of a method 650 for reading/receiving data from a medium according to the present disclosure are shown. Control begins at 652. At 654, control receives a read command from the host. At 656, control reads/receives N portions of encoded data from the medium via N read channels/receivers in parallel, respectively, where N is an integer greater than 1. At 658, control outputs the N portions to N channel FIFOs in parallel, respectively. At 660, control buffers the N portions. At 662, control decodes the N portions and generates decoded data. At 664, control outputs the decoded data to the host. Control ends at 666.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A hard disk controller (HDC) of a hard disk drive (HDD), the HDC comprising:
an encoder module configured to
encode data received from a host, and
generate P units of encoded data, where P is an integer greater than 1;
a buffer FIFO module configured to
receive the P units from the encoder module, and
output the P units;
a buffer manager module configured to
receive the P units from the buffer FIFO module,
store the P units in a buffer,
retrieve N of the P units from the buffer, and
output the N units in parallel, where N is an integer greater than 1;
N first-in first-out (FIFO) modules configured to respectively receive the N units in parallel directly from the buffer manager; and
N read channel modules configured to
receive the N units from the N FIFO modules in parallel, respectively, and output the N units to a magnetic medium of the HDD.

2. The HDC of claim 1, wherein the encoder module is configured to encode the data using an error correcting code (ECC).

3. The HDC of claim 1, further comprising:
a host interface module configured to receive the data from the host; and
a host FIFO module configured to
receive the data from the host interface module, and
output the data to the encoder module.

4. The HDC of claim 1, further comprising:
a control module configured to output a control signal to the host when a Pth of the P units is stored in the buffer,
wherein the control signal indicates that the P units are output to the magnetic medium, and
wherein the encoder module is configured to receive additional data from the host based on the control signal when less than the P units are output to the magnetic medium.

5. The HDC of claim 1, wherein:
the N read channel modules are configured to
receive N data units from the magnetic medium, and
output the N data units to the N FIFO modules in parallel, respectively;
the N FIFO modules are configured to output the N data units to the buffer manager module in parallel, respectively; and
the buffer manager module is configured to store the N data units in the buffer.

6. The HDC of claim 5, wherein:
the buffer FIFO module is configured to
receive the N data units from the buffer manager module, and
output the N data units;
the HDC further comprising:
a decoder module configured to
receive the N data units from the buffer FIFO module, and
decode the N data units to generate decoded data;
a host FIFO module configured to
receive the decoded data from the decoder module, and
output the decoded data; and
a host interface module configured to
receive the decoded data from the host FIFO module, and
output the decoded data to the host.

7. The HDC of claim 6, wherein the decoder module is configured to decode the N data units using an error correcting code (ECC).

8. A hard disk controller (HDC) of a hard disk drive (HDD), the HDC comprising:
- N read channel modules configured to
  - receive N data units from a magnetic medium of the HDD, and
  - output the N data units in parallel, respectively, where N is an integer greater than 1;
- N first-in first-out (FIFO) modules configured to
  - receive the N data units in parallel from the N read channel modules, respectively, and
  - output the N data units in parallel, respectively;
- a buffer manager module configured to
  - receive the N data units directly from the N FIFO modules, and
  - store the N data units in a buffer;
- a buffer FIFO module configured to
  - receive the N data units from the buffer manager module, and
  - output the N data units; and
- a decoder module configured to
  - receive the N data units from the buffer FIFO module,
  - decode the N data units to generate decoded data.

9. The HDC of claim 8, further comprising:
- a host FIFO module configured to
  - receive the decoded data from the decoder module, and
  - output the decoded data; and
- a host interface module configured to
  - receive the decoded data from the host FIFO module, and
  - output the decoded data to a host.

10. A method for operating a hard disk drive (HDD), the method comprising:
- receiving data from a host;
- generating P units of encoded data by encoding the data, where P is an integer greater than 1;
- receiving the P units at a buffer FIFO module; and
- outputting the P units from the buffer FIFO module;
- receiving the P units from the buffer FIFO module at a buffer manager module;
- storing the P units in a buffer;
- retrieving N of the P units from the buffer using the buffer manager module, where N is an integer greater than 1;
- outputting the N units in parallel from the buffer manager module to N first-in first-out (FIFO) modules, respectively;
- receiving the N units from the N FIFO modules in parallel at N read channel modules, respectively; and
- outputting the N units from the N read channel modules to a magnetic medium of the HDD.

11. The method of claim 10, further comprising:
- receiving N data units from the magnetic medium at the N read channel modules;
- outputting the N data units from the N read channel modules to the N FIFO modules in parallel, respectively;
- outputting the N data units from the N FIFO modules to the buffer manager module in parallel, respectively; and
- storing the N data units in the buffer.

12. The method of claim 11, further comprising:
- receiving the N data units at the buffer FIFO module from the buffer manager module;
- outputting the N data units from the buffer FIFO module;
- generating decoded data by decoding the N data units;
- receiving the decoded data at a host FIFO module;
- outputting the decoded data from the host FIFO module;
- receiving the decoded data from the host FIFO module at a host interface module; and
- outputting the decoded data from the host interface module to the host.

13. A method for operating a hard disk drive (HDD), the method comprising:
- receiving N data units from a magnetic medium of the HDD at N read channel modules, where N is an integer greater than 1;
- outputting the N data units in parallel from the N read channel modules, respectively;
- receiving the N data units in parallel at N first-in first-out (FIFO) modules, respectively;
- outputting the N data units in parallel from the N FIFO modules, respectively; and
- receiving the N data units directly from the N FIFO modules at a buffer manager module;
- storing the N data units in a buffer
- receiving the N data units from the buffer manager module at a buffer FIFO module;
- outputting the N data units from the buffer FIFO module to a decoder module; and
- generating decoded data by decoding the N data units using the decoder module.

14. The method of claim 13, further comprising:
- receiving the decoded data at a host FIFO module;
- outputting the decoded data from the host FIFO module;
- receiving the decoded data from the host FIFO module at a host interface module; and
- outputting the decoded from the host interface module to a host.

15. The method of claim 10, further comprising:
- outputting a control signal to the host when a Pth of the P units is stored in the buffer, wherein the control signal indicates that the P units are output to the magnetic medium; and
- receiving additional data from the host based on the control signal when less than the P units are output to the magnetic medium.

16. The method of claim 10, further comprising:
- receiving the data from the host at a host FIFO module via a host interface module; and
- outputting the data to an encoder module to generate the P units.

17. The method of claim 10, further comprising generating the P units by encoding the data using an error correcting code (ECC).

18. A hard disk controller (HDC) of a hard disk drive (HDD), the HDC comprising:
- an encoder module configured to
  - encode data received from a host, and
  - generate P units of encoded data, where P is an integer greater than 1;
- a buffer manager module configured to
  - store the P units in a buffer,
  - retrieve N of the P units from the buffer, and
  - output the N units in parallel, where N is an integer greater than 1;
- N first-in first-out (FIFO) modules configured to respectively receive the N units in parallel directly from the buffer manager;
- N read channel modules configured to
  - receive the N units from the N FIFO modules in parallel, respectively, and
  - output the N units to a magnetic medium of the HDD; and
- a control module configured to output a control signal to the host when a Pth of the P units is stored in the buffer, wherein the control signal indicates that the P units are output to the magnetic medium, and wherein the encoder module is configured to receive additional data from the host based on the control signal when less than the P units are output to the magnetic medium.

19. A method for operating a hard disk drive (HDD), the method comprising:

receiving data from a host;

generating P units of encoded data by encoding the data, where P is an integer greater than 1;

storing the P units in a buffer;

retrieving N of the P units from the buffer using a buffer manager module, where N is an integer greater than 1;

outputting the N units in parallel from the buffer manager module to N first-in first-out (FIFO) modules, respectively;

receiving the N units from the N FIFO modules in parallel at N read channel modules, respectively;

outputting the N units from the N read channel modules to a magnetic medium of the HDD;

outputting a control signal to the host when a Pth of the P units is stored in the buffer, wherein the control signal indicates that the P units are output to the magnetic medium; and receiving additional data from the host based on the control signal when less than the P units are output to the magnetic medium.

20. The HDC of claim 8, wherein the decoder module is configured to decode the N data units using an error correcting code (ECC).

21. The method of claim 13, further comprising decoding the N data units using an error correcting code (ECC).

* * * * *